United States Patent [19]

Romero-Medrano

[11] 4,402,784

[45] Sep. 6, 1983

[54] ROLL WINDING APPARATUS AND METHOD

[75] Inventor: Antonio L. Romero-Medrano, Gainesville, Fla.

[73] Assignee: General Electric Company, Gainesville, Fla.

[21] Appl. No.: 241,334

[22] Filed: Mar. 6, 1981

[51] Int. Cl.[3] .............................................. B65C 3/12
[52] U.S. Cl. .................................. 156/446; 29/623.1; 156/457; 156/458; 242/56.1
[58] Field of Search ............... 156/446, 447, 456–458, 156/184; 493/303–306; 29/623, 623.1–623.5; 242/56.1

[56] References Cited

U.S. PATENT DOCUMENTS

| | | | |
|---|---|---|---|
| 3,446,684 | 5/1969 | Pall et al. | 156/446 X |
| 4,064,725 | 12/1977 | Hug et al. | 29/623.1 X |
| 4,153,493 | 5/1979 | Hollander et al. | 156/446 X |
| 4,153,498 | 5/1979 | Bichot et al. | 156/446 |

Primary Examiner—David A. Simmons
Attorney, Agent, or Firm—Henry J. Policinski

[57] ABSTRACT

An improved apparatus and method are disclosed for winding into a spiral roll the positive (186) and negative (241) plates of small cylindrical batteries. The originally flat positive and negative pasted plates are conveyed through stations at which they are automatically wrapped with strips of separator material (24, 84). Then the wrapped plates are stacked in a staggered pattern and conveyed to a winding station (78). There the stack of plates is wound into a spiral roll around an arbor (332) surrounded by three driven rolls (322, 324, 326) over which a guide belt (366) is run. As the spiral roll is formed, the driven rolls move radially outwardly from the arbor under the control of a mechanism (362, 402–430) which ensures that the final roll diameter will be within desired tolerances. The outermost layer of plate wrapping material is thermally sealed (104, 105) to the roll to prevent its unwinding; and then a further mechanism (432–478) automatically ejects the completed roll from the arbor.

14 Claims, 32 Drawing Figures

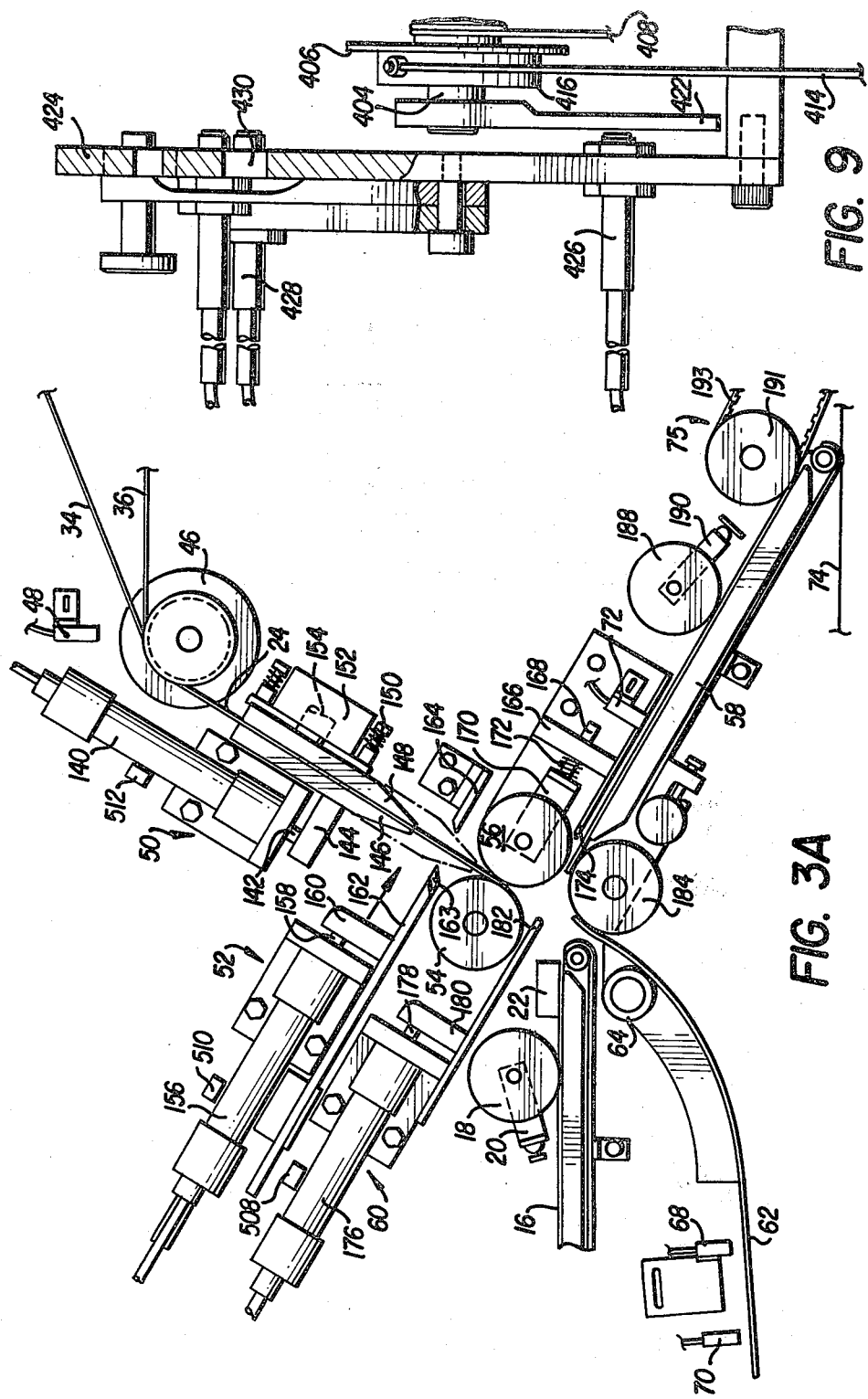

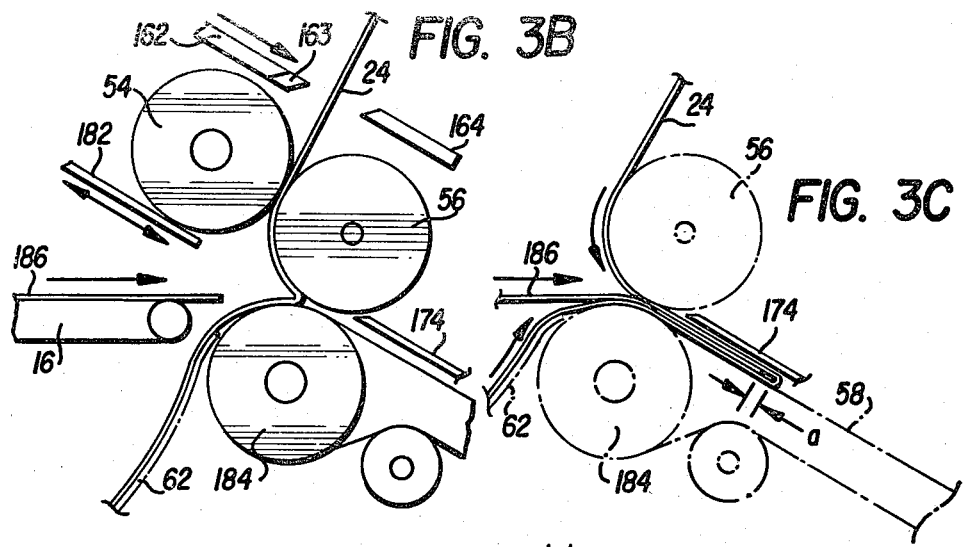
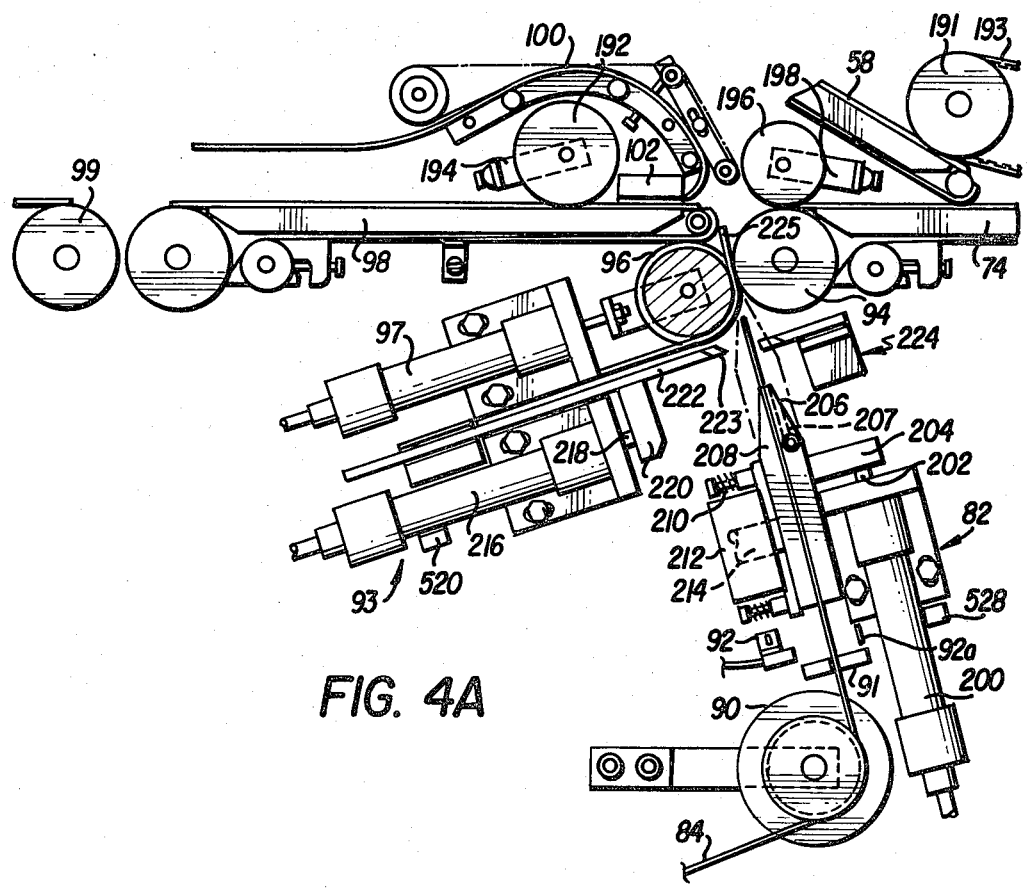

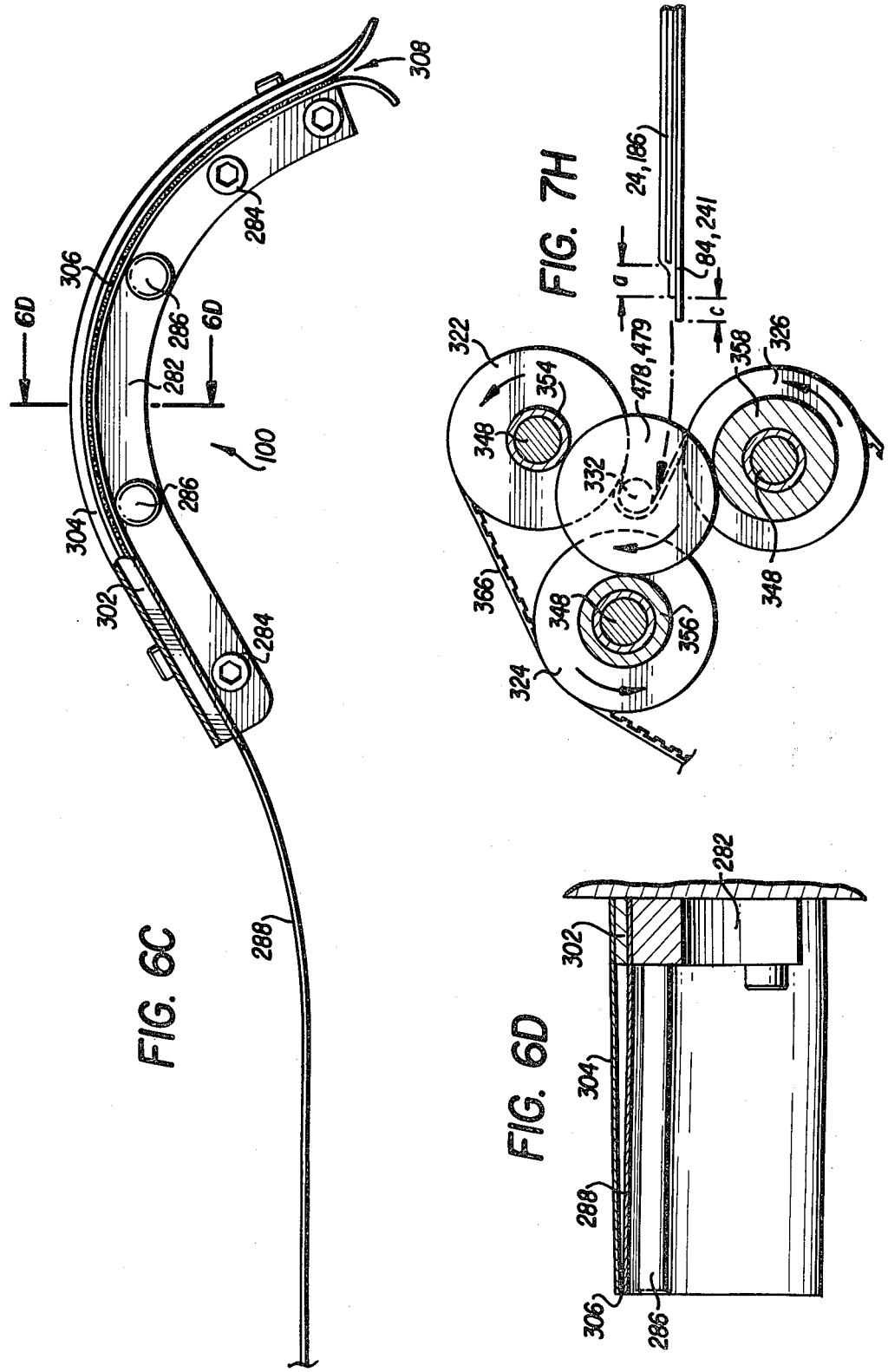

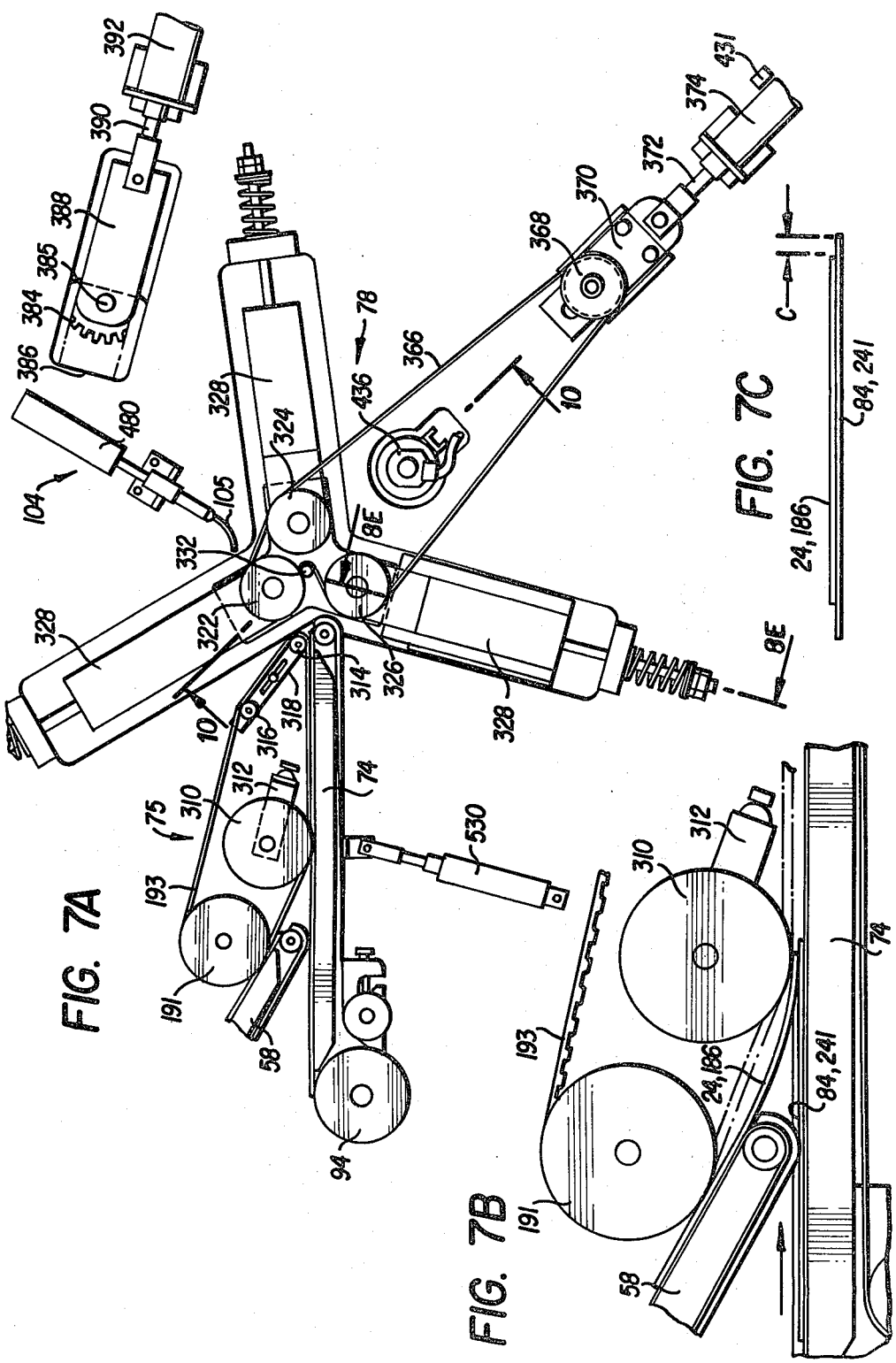

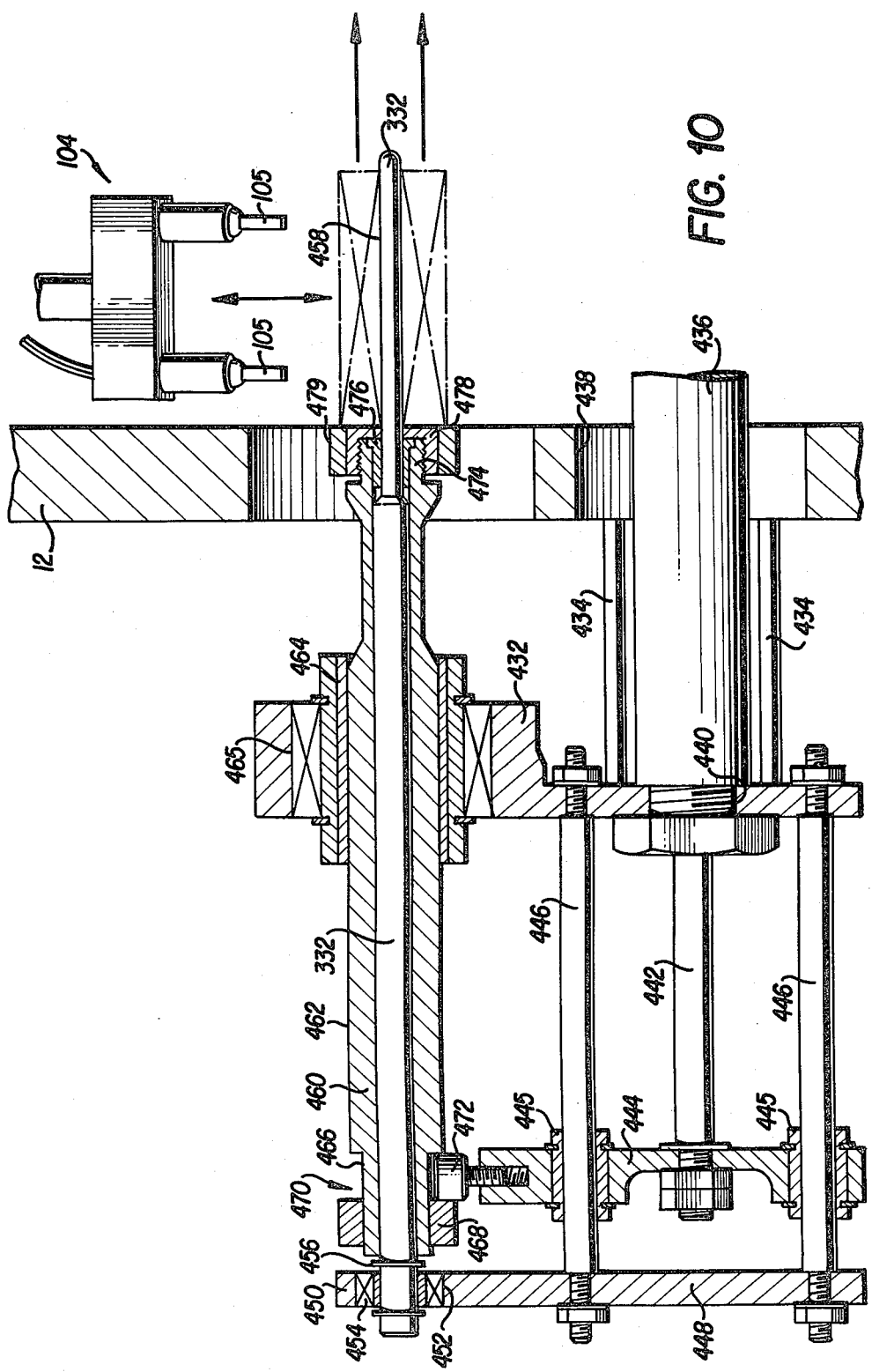

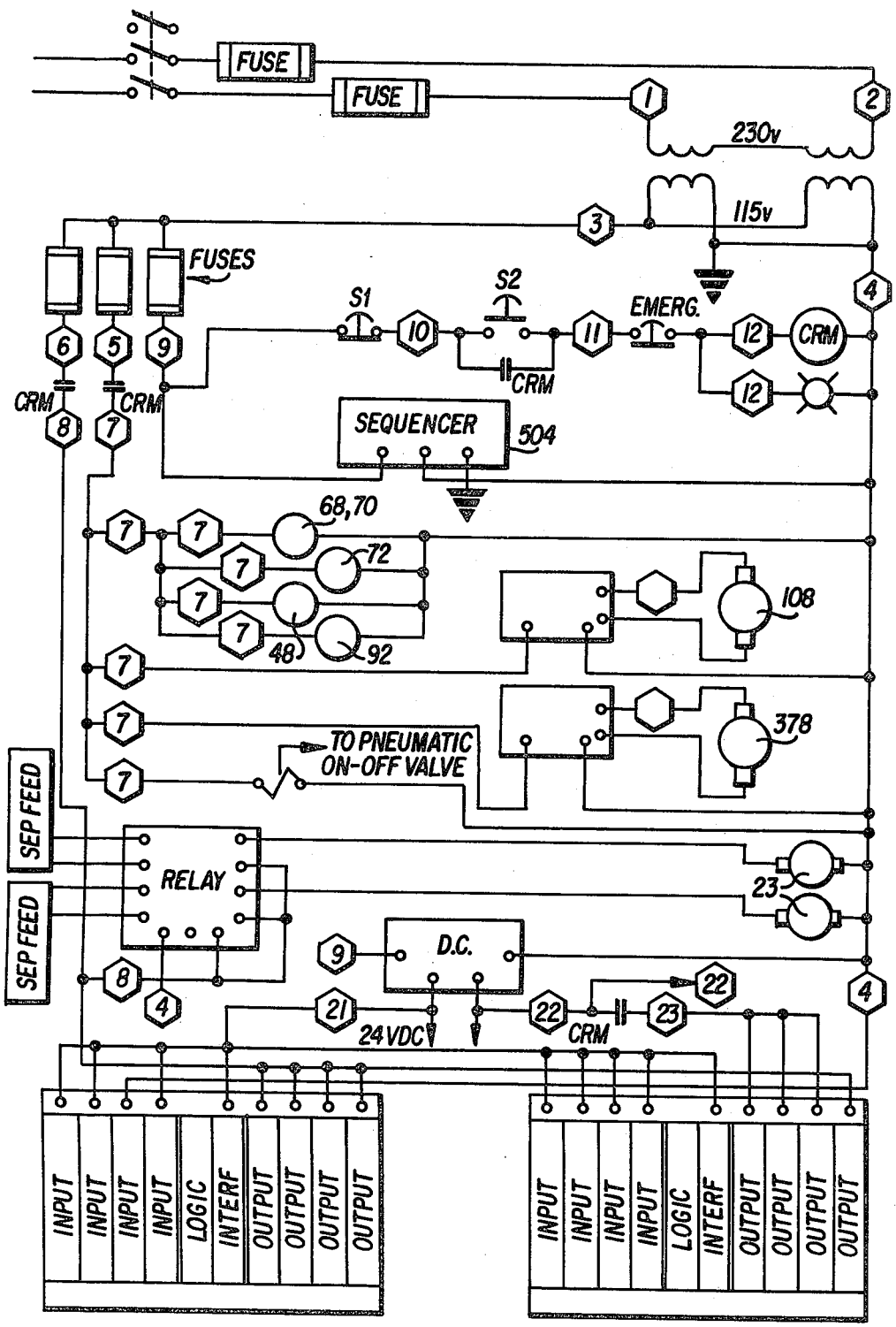
FIG. 13A POWER

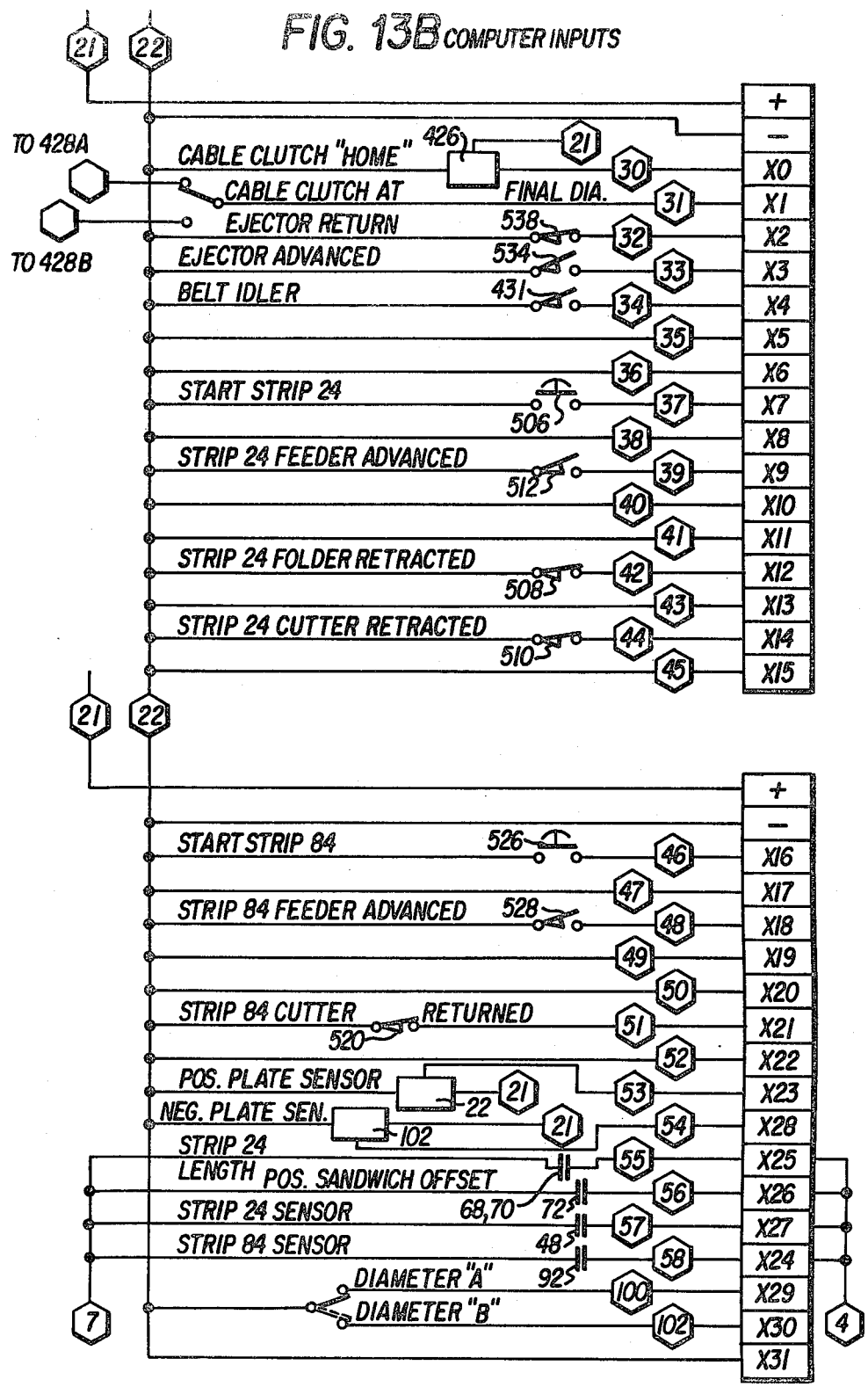
FIG. 13B COMPUTER INPUTS

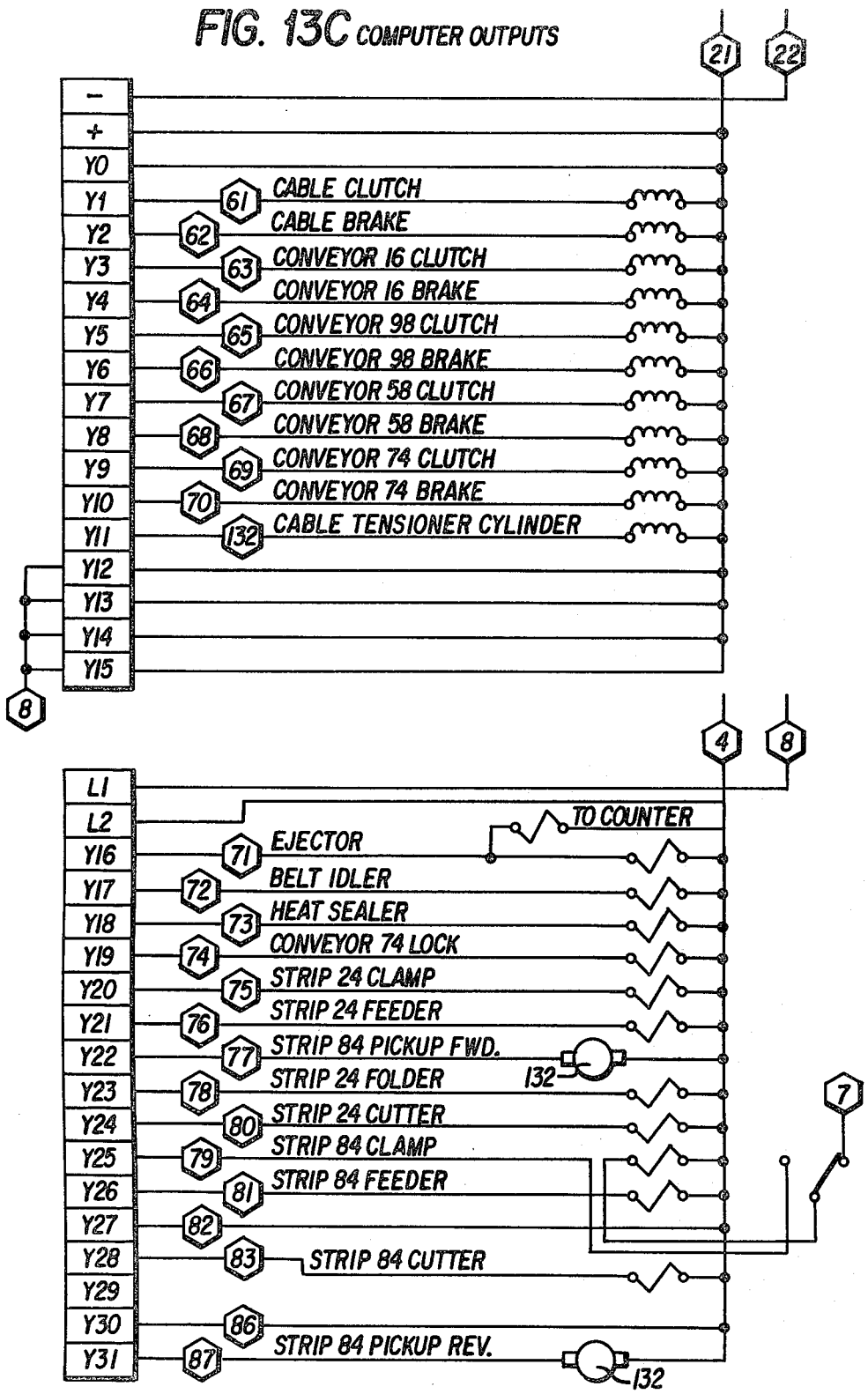
FIG. 13C COMPUTER OUTPUTS

ROLL WINDING APPARATUS AND METHOD

DESCRIPTION

1. Technical Field

The present invention concerns apparatuses and methods for winding one or more strips of material into a spiral roll. More particularly, the invention concerns an apparatus and method for wrapping and stacking the positive and negative plates of small cylindrical batteries and then for winding the wrapped stacked plates into a spiral roll which subsequently is inserted into a battery container.

2. Background Art

During the manufacture of small cylindrical batteries, the plates of the battery are first formed from metal grids to which an appropriate electrochemical paste material is applied. Various grid and paste materials are used for such plates, as will be understood by those skilled in the art. For example, lead, lithium, nickel, cadmium and the like have been used for grid materials. The formation of the grid and the application of the electrochemical paste typically are accomplished automatically. However, assembly of the pasted grids into a form suitable for insertion into a cylindrical battery case has involved slow manual operations. Specifically, in prior art devices, the positive and negative plates have proceeded from the pasting station along conveyors where they have been manually wrapped with appropriate electrically insulating separator sheets made from a material such as fiber glass, polypropylene, polyester and the like. Thereafter, a sandwich of alternate positive and negative plates has been assembled in a flat form, the geometry of the plates being a function of the size and power requirements of the ultimate battery. For small cylindrical batteries, a single positive and a single negative plate have been used. Each plate typically has included a plurality of tabs extending from one of its long sides. The positive and negative plates have been staggered slightly in the sandwich so that when the spiral roll is completed the negative tabs will be alinged with each other at the end of the roll and the positive tabs will be similarly aligned. This alignment eases attachment of the battery electrodes.

The sandwich then has been fed manually into a roll winding mechanism of the type in which a plurality of driven winding rollers surrounds a stationary, freely rotatable arbor. A wide belt passes between the winding rollers and the arbor to define a space between the arbor and the belt in which winding takes place. The lead edge of the sandwich has been inserted manually between the arbor and the belt so that the driven rollers acting on the opposite side of the belt would cause the sandwich to be drawn around the arbor and wound into a spiral roll. The operator then manually applied a securing strip of a suitable plastic tape to the outside diameter of the roll and actuated a mechanism to eject the taped roll from the arbor. The tape prevented the roll from unwinding.

While this type of prior art roll winding process and apparatus has achieved a certain degree of acceptance in the industry, the relatively slow rate of production and high cost of operation thereof have fostered a strong interest in an automated apparatus and process for manufacturing the rolls used for battery cores. Moreover, since the winding rollers used in prior art, manually fed machines move radially from the arbor only in response to the increasing diameter of the roll as it forms on the arbor, the final diameter of the roll, the alignment of grid electrode tabs and the spacing between plies within the roll have been subject to undesirable variations. Factors such as operator error, variations in operator techniques, irregularities in the pasted battery plates and wrapping materials, changes in the rate of feed into the rollers and similar variables all are thought to contribute to these variations. Thus, a need has existed for a roll winding apparatus and method which would ensure that the final geometry of the battery core is essentially uniform regardless of normal variations in the plate and wrapper materials. One prior art approach to meeting such a need is disclosed in U.S. Pat. No. 4,064,725 issued to Hug et al and assigned to the Gates Rubber Company; however, the patented apparatus is rather complex.

DISCLOSURE OF THE INVENTION

An object of the present invention is to provide an efficient method and apparatus for winding battery plates and separator materials into a spiral roll.

Another object of the invention is to provide such a method and apparatus in which pasted negative and positive battery plates are received and automatically assembled into spiral rolls, each comprising one positive and one negative plate.

A further object of the invention is to provide such a method and apparatus in which, other than formation into a spiral, no significant modification in plate geometry is accomplished which could affect battery operation.

Yet another object of the invention is to provide such a method and apparatus in which the final diameter of the spiral roll is controlled within desired limits.

A still further object of the invention is to provide such a method and apparatus in which variations in plate-to-plate spacing are minimized across the diameter of the spiral roll.

Still another object of the invention is to provide such a method and apparatus in which the tabs of the positive plate and those of the negative plate, respectively, are aligned at the ends of the spiral roll so as to facilitate attachment of battery lead posts or electrodes.

These objects of the invention are given only by way of example; thus, other desirable objectives and advantages inherently achieved by the disclosed structure may occur or become apparent to those skilled in the art. Nonetheless, the scope of the invention is to be limited only by the appended claims.

One aspect of the present invention concerns an improved apparatus for winding an elongated element, such as a stack of pasted, wrapped plates for a cylindrical battery, into a spiral roll. This apparatus includes a means for conveying the elements and a freely rotatable winding arbor situated adjacent the outfeed end of the means for conveying. A plurality of winding rollers are positioned about the arbor and means are provided for rotating at least one, but preferably all, of the rollers to wind a roll on the arbor. The rollers are mounted so as to permit their radial movement away from the arbor as a spiral roll is formed between the rollers and the arbor. Means are provided for guiding the leading edge of the element at least partially around the arbor between the arbor and the winding rollers to start winding. Radial movement of the rollers away from the arbor is constrained to a predetermined rate and is stopped at a predetermined distance from the arbor, thereby fixing the final diameter of the spiral roll.

As the element is engaged by the arbor and winding rollers, it encounters a guiding means which comprises at least one guide belt threaded at least partially around the side of the arbor which is opposite to the outfeed end of the conveyor. Means are provided for maintaining tension on the guide belt. Upon a predetermined increase in the tension of the guide belt, the means for constraining radial movement of the winding rollers is actuated as the leading edge of the element is wound between the guide belt and the arbor. The tension in the belt is then released. Preferably, the guide belt is a closed loop driven at the same speed as that of the winding rollers. To facilitate insertion of the flat element between the arbor and the guide belt, the arbor is laterally spaced from the outfeed end and the guide belt extends across the path of elements leaving the outfeed end at an angle of approximately 20 to 30° measured from the path. Tension is maintained on the guide belt by passing it over an idler pulley and then adjusting the position of the idler pulley to apply tension to the belt.

As previously indicated, it is preferred that three winding rollers be positioned about the arbor. To facilitate insertion of the elements to be wound between the arbor and the winding rollers, the first roller to be encountered by an element is spaced from the arbor a distance approximately equal to the overall thickness of the element; and the successive rollers are progressively closer to the arbor. This arrangement provides a tapered path for the leading edge of the element thereby permitting the element to be caught between the guide belt and the arbor before the element fully engages all of the winding rollers.

The winding rollers preferably are mounted for rotation with separate shafts positioned parallel to the winding arbor. The shafts are supported by means which permit radial movement of the rollers relative to the winding arbor. To constrain movement of the rollers, an elongated flexible element, such as length of cable, extends from a fixed anchor point at one end, and at least partially around at least one of the winding roller shafts, though preferably the cable passes at least partially around all of the shafts. The other end of the cable is attached to a suitable means for releasing it at a predetermined velocity so as to permit the shafts and winding rollers to move radially away from the arbor at a predetermined velocity. To achieve the desired velocity of the cable, the releasing means comprises a drum for winding and unwinding the cable and means for rotating the drum at a fixed angular velocity. Rotation of the drum is sensed during operation and stopped when the drum has payed out a sufficient length of the cable to correspond to the desired final diameter of the spiral roll.

Although the roll winding apparatus according to the invention is suited for use to wind a variety of elements, it is particularly adapted for winding a stack of flat elements such as wrapped battery plates for a cylindrical battery. In order to maintain the alignment of the elements of such a stack, a pair of conveyors are used to deliver the stack to the winding mechanism, one conveyor being positioned above and one being positioned below the stack. Since some relative, axial movement of the elements of the stack must be permitted during winding due to the different radial positions of the elements in the growing spiral roll, means are provided for moving the lowermost conveyor away from the stack once winding has commenced. Where the stack comprises a pair of elements, the lowermost element is carried on the lower conveyor and the uppermost element is deposited on it by a further conveyor. In the preferred embodiment, the belt of the uppermost conveyor also passes over the outfeed end of the further conveyor to guide its element during formation of the stack. Means are also provided for thermally sealing the outermost layers of the completed roll to prevent its unwinding following ejection from the arbor.

When battery plates are to be wound by the previously described winding apparatus, they are wrapped within thin strips of wrapping material, such as separator material used in a cylindrical battery core. Elements such as flat battery plates move along a first conveyor having an outfeed end. A strip of wrapping material is withdrawn from a source, such as a spool, and its leading edge is inserted into a means for driving the strip past the outfeed end of the conveyor. When a predetermined length of the strip has passed through the driving means, the conveyor is started to move one of the elements into contact with the strip so that the strip folds itself about and wraps the element. For some wrapping operations, means are provided for folding the strip across its width at a location adjacent the outfeed end of the conveyor so that the folded strip extends into a nip defined between a pair of rollers arranged in the path of elements leaving the outfeed end of the conveyor. Preferably, the strip is withdrawn from its spool using a pair of clamping jaws mounted on means for advancing the jaws toward and withdrawing them from the driving means. The driving means itself preferably comprises a first, driven roller and a second, idler roller, the second roller being pressed against the first roller to define a nip into which the leading edge of the strip of material may be inserted during operation. In cases where the strip is made from a particularly thin, flexible material, the idler roller may be provided with a circumferentially extending groove through which an air jet conduit extends for directing a stream of air past the outfeed end of the conveyor to prevent the strip from deflecting onto the conveyor during operation. Similarly, on the side of the strip facing away from the outfeed end of the conveyor, a further air jet conduit means may be provided for directing a stream of air toward the driving means to deflect the strip into engagement with the driving means.

When the previously discussed winding apparatus and element wrapping apparatus are combined in accordance with the present invention, a pair of flat elements such as the positive and negative plates of a cylindrical battery are first wrapped with strips of separator material, then stacked in a staggered relation and then fed to the winding apparatus. The apparatus first wraps the uppermost plate of the stack and then holds it until the lowermost plate has been wrapped and conveyed to a location at which the uppermost plate may be deposited thereon. Then, when the winding apparatus is ready to receive an element for winding, the stack is conveyed into engagement with the winding arbor and rollers.

A unique, modular conveyor is used in the apparatus according to the invention. An elongated conveyor bed is provided which has an essentially flat upper surface for supporting elements such as battery plates. A drive roller is mounted on a shaft positioned transversely to the conveyor bed at one end thereof, the shaft having an extension which serves as a support about which the conveyor may be pivoted during operation. An idler roller is mounted transversely to the bed at the other end thereof and a flat, endless belt extends along the upper surface of the bed, around the drive and idler rollers and beneath the bed. A take-up roller is mounted transversely to the conveyor bed at a location beneath the bed and means are provided for selectively moving the take-up roller into contact with the opposite side of the belt from that side which contacts the drive and idler rollers. This location of the take-up roller permits the tension of the belt to be easily adjusted. Preferably, the take-up roller is positioned adjacent the drive roller so that as the take-up roller moves toward the drive roller, the wrap angle of the belt on the drive roller is increased, thereby increasing the frictional engagement of the belt and the drive roller. Preferably, the conveyor bed is made from a material having a high degree of lubricity to minimize power losses due to the friction between the belt and the conveyor bed. Finally, to ensure that the surface over which the battery plates move is free from obstructions which could flex the plate unnecessarily, the drive and idler rollers are positioned to establish line contact with a plane extending along the upper surface of the conveyor bed.

In accordance with the method of the invention, a flat, elongated element may be wound into a spiral roll by first providing a freely rotatable winding arbor and positioning a plurality of winding rollers about the arbor. At least one of the rollers is rotated and the leading edge of the element is fed between the arbor and the at least one roller so that the leading edge is wound at least partially around the arbor. The rollers are permitted to move radially away from the arbor as a spiral roll is formed from the element but are constrained to movement at a predetermined rate. Radial movement of the rollers is stopped at a predetermined distance from the arbor, thereby fixing the final diameter of the spiral roll. At least one guide belt may be provided around the side of the arbor opposite that from which the leading edge of the element approaches. Tension is maintained on the guide belt at least until the leading edge has been wound on the arbor, after which the tension on the guide belt is released. To facilitate insertion of the leading edge of the element between the arbor and the winding rollers, the winding rollers are positioned at progressively smaller distances from the arbor. Constraining movement of the rollers is accomplished by the steps of providing an elongated flexible element which extends from a fixed anchor at one end thereof; winding the flexible element at least partially around at least one of the shafts on which the winding rollers rotate; and releasing the flexible element at a predetermined velocity to permit the shafts of the winding rollers to move radially away from the arbor.

BRIEF DESCRIPTION OF THE DRAWINGS

FIG. 3A shows an enlarged fragmentary view of the portion of the apparatus shown in FIG. 1 in which the positive battery plate and separator material are combined.

FIGS. 3B and 3C illustrate stages in the operation of the apparatus shown in FIG. 3A.

FIG. 3D shows a side view of a wrapped positive battery plate as produced by the apparatus shown in FIG. 3A-3C.

FIG. 4A shows an enlarged fragmentary view of the portion of the appartus shown in FIG. 1 in which the negative battery plate and separator material are combined.

FIG. 6C shows an elevation view of a preferred, air operated separator guide for use in the invention.

FIG. 6D shows a view taken on line 6D—6D of FIG. 6C.

FIG. 7A shows an enlarged fragmentary view of the roll winding portion of the apparatus shown in FIG. 1.

FIG. 7B shows a fragmentary view of the apparatus shown in FIG. 7A indicating how the positive and negative plates are conveyed and stacked to form a sandwich for insertion into the winding mechanism.

FIG. 7C shows a schematic side view of the battery plate sandwich prior to its insertion into the winding mechanism.

FIG. 7H shows a view of the back side of the winding rollers illustrating their orientation relative to the winding arbor and the incoming stack of wrapped plates.

FIG. 9 shows a view taken along line 9—9 of FIG. 8, illustrating a portion of the mechanism for controlling roll diameter.

FIG. 10 shows a view taken along line 10—10 of FIG. 7A, indicating the mounting of the winding arbor and the mechanism for ejecting a completed roll.

FIGS. 13A–13C show schematically the elecrical controls used with the apparatus shown in FIGS. 1–12.

BEST MODE FOR CARRYING OUT THE INVENTION

Figure 1A:
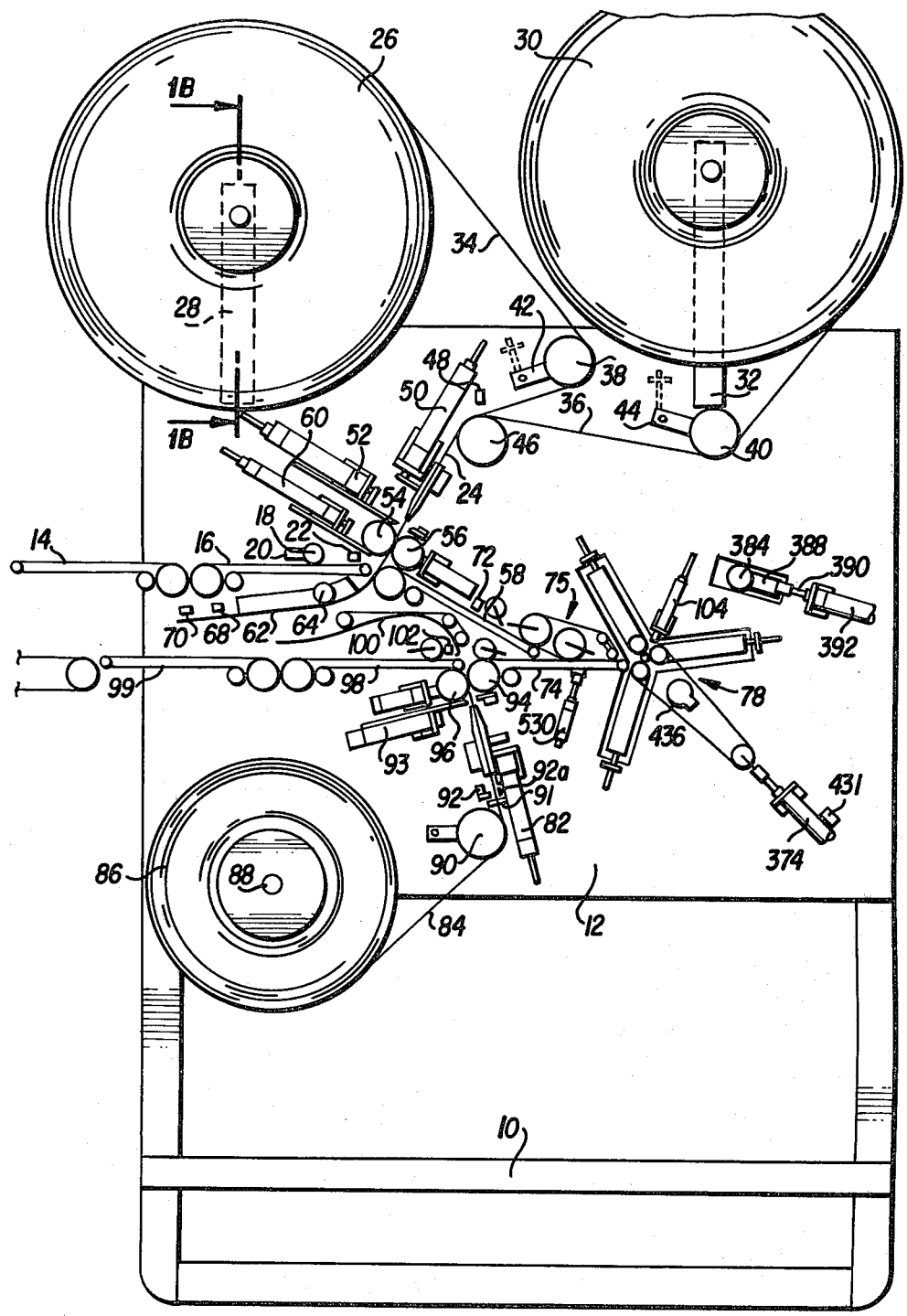
FIG. 1A shows a front elevation view, partially schematic in nature, of a battery plate wrapping and roll winding apparatus according to the present invention.

The following is a detailed description of the invention, reference being made to the drawings in which like reference numerals identify like elements of structure in the several Figures.

As shown in FIG. 1A, an apparatus according to the invention comprises a vertically oriented stand 10 which may be assembled from suitable materials such as angle iron or the like. A rigid vertical base plate 12 made from a material such as aluminum is attached to stand 10. A modular conveyor 14 is attached to base plate 12 for feeding positive battery plates to the apparatus. A further modular conveyor 16 carries plates from conveyor 14 beneath a gravity actuated hold-down roller 18 pivoted to base plate 12 on an arm 20. In operation, movement of the plate on conveyor 16 is stopped when the plate reaches a position sensor 22 such as a metal proximity detector or the like.

A strip 24 of appropriate separator material such as fibreglass unwoven cloth is fed from large rolls 26, 30 supported on base plate 12 by means of brackets 28, 32. Of course, other separator materials may be used for a given battery type without departing from the scope of the present invention. Strip 24 comprises two plies made up of separate strips 34, 36 which pass, respectively, beneath feeder spools 38, 40 pivoted to base plate 12 on counter balanced pivot arms 42, 44. Strips 34, 36 come together to form a double-thickness strip 24 at a stationary idler spool 46 above which a strip sensor 48, such as an optical reflectance scanner, detects the presence or absence of strips 34, 36.

From spool 46, strip 24 passes between the open jaws of a clamper-feeder mechanism 50, past a cutter mechanism 52 and toward the nip defined between a driven separator roller 54 and a separator pressing roller 56. With its jaws closed, the feeder is advanced. Then, with rollers 54, 56 turning, the jaws are opened so that strip 24 is pulled/pushed past the infeed end of a further, downwardly angled modular conveyor 58 and a separator folder mechanism 60 and onto the upper surface of a separator skip plate 62. Meanwhile, feeder mechanism 50 retracts. Strip 24 moves along plate 62 beneath a roller 64 until its lead edge passes one of sensors 68, 70 such as optical reflectance scanners, the appropriate one of which will be actuated depending upon the length of separator desired for a given diameter battery.

When the lead edge of a strip 24 has reached the appropriate one of sensors 68, 70, conveyors 14 and 16 are started; folder mechanism 60 is advanced and quickly retracted; and simultaneously conveyor 58 is stopped. Strip 24 thus is folded by mechanism 60 so that it extends at least partially beneath pressing roller 56 ahead of the positive plate now moving on conveyor 16. When the leading edge of the positive plate reaches sensor 22 a short time delay passes before conveyor 58 is started to feed the plate between pressing roller 56 and the drive roller of conveyor 58. This delay provides a proper spacing between the leading edge of the plate and the leading edge of its separator wrapper. When the leading edge of the resulting plate and separator sandwich reaches a sensor 72 positioned above conveyor 58, conveyors 14, 16 and 58 stop. The position of sensor 72 on conveyor 58 controls the axial offset of each positive plate behind the negative plate on which it will rest. At this point, cutter mechanism 52 has not yet been actuated to sever strip 24 and will not be until the trailing edge of the positive plate passes sensor 22.

While the wrapped positive plate is approaching sensor 72, the following takes place. A modular conveyor 74, which is positioned beneath the outfeed end of downwardly angled conveyor 58 and has its outfeed end positioned to deliver a stack of plates to a roll winding mechanism 78, is turned on. A stack-holder conveyor 75 positioned above conveyor 74 also is turned on to hold the wrapped plates in position as they enter the winding mechanism 78. Simultaneously, clamper-feeder mechanism 82 is advanced to pull a further separator strip 84 made from a thin heat sealable polyester material, from a large roll 86 supported on base plate 12 by an appropriate shaft 88. Strip 84 is led past a pivoted feeder spool 90, through a friction retainer 91, past a reflective sensor 92 and its mirror 92a, and through clamper-feeder 82, the jaws of which are closed. After this, it passes a cutter mechanism 93 and, when the jaws of clamper-feeder 82 are opened it is pulled through the nip defined between the drive roller 94 of conveyor 74 and a pressing roller 96. Then, strip 84 is pulled/pushed by rollers 94, 96 past the end of a modular conveyor 98 which receives negative plates from a further modular conveyor 99. Both conveyors 98 and 99 are stopped at this point in the sequence. Strip 84 then passes into a take-up mechanism 100.

After a time delay chosen to ensure that the proper length of strip 84 has been fed into mechanism 100, conveyors 74 and 75 are stopped, and conveyors 98, 99 are started to move a negative plate toward strip 84 which now extends across the path of a plate moving on conveyor 98. After a further time delay, clamper-feeder 82 is retracted; however, its jaws remain open. A sensor 102 above the outfeed end of conveyor 98 eventually is reached by the leading edge of a negative plate and conveyors 98, 99 are stopped. Then, when sensor 72 above downwardly angled conveyor 58 is actuated to indicate the presence of the leading edge of a wrapped positive plate, conveyors 74, 75 and 98, 99 are started so that the wrapped positive plate is stacked on top of the wrapped negative plate. After a time delay chosen depending upon the desired length of material to be cut from strip 84, the jaws of clamper-feeder 82 close and cutter mechanism 93 is actuated to sever strip 84. When the trailing edge of the negative plate passes sensor 102, conveyors 98, 99 are stopped. After a time delay depending on the size of the battery core to be wound, conveyors 74, 75 are stopped as the stack of plates is drawn into winding mechanism 78.

Winding of the roll then proceeds. The completed roll is ejected at the front of the machine and the outer wrapper layer, a portion of strip 84, is sealed to the roll by a heat sealer mechanism 104. The structural details of the various mechanisms previously mentioned are in greater detail with regard to FIGS. 1B-13.

Figure 1B:
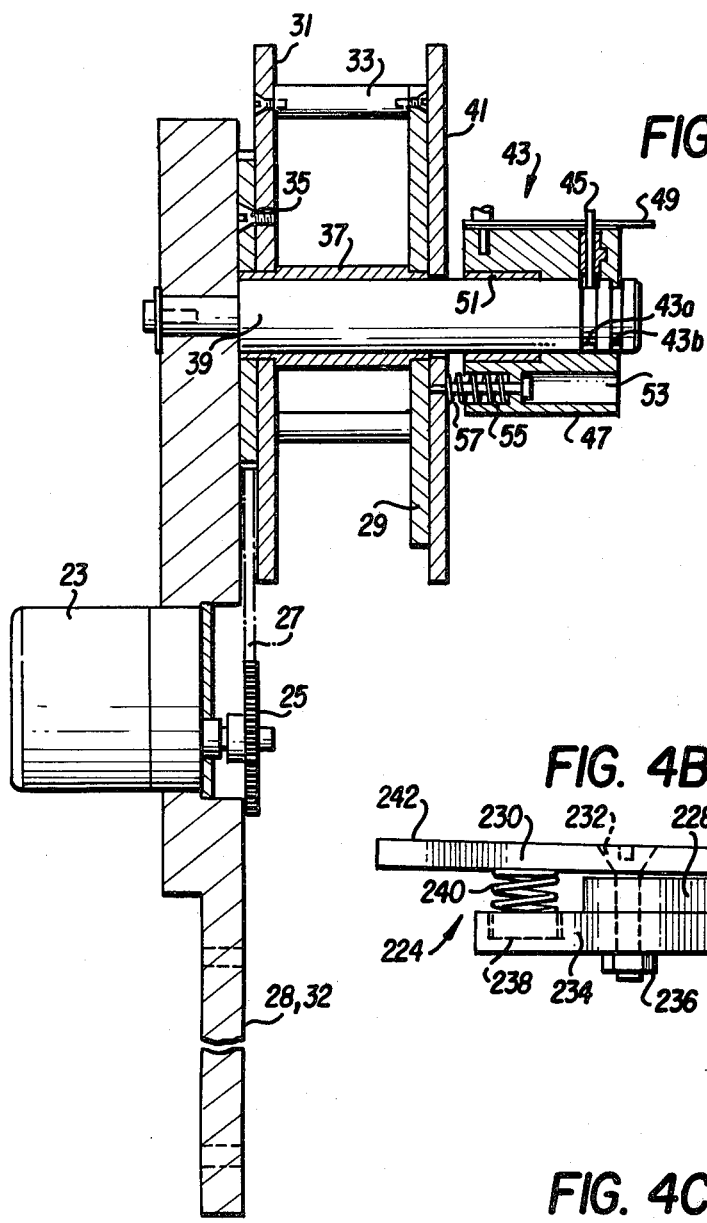
FIG. 1B shows view, partially in section, taken along line 1B—1B of FIG. 1A, illustrating the separator spindle drive used in the invention.

FIG. 1B illustrates how rolls 26, 30 are supported and driven. Each of brackets 28, 32 supports a small motor 23 having an output sprocket 25 over which a suitable chain 27 passes. Rolls 26, 30 are open-wound onto a spindle made up from a front plate 29 connected to a back plate 31 by at least three spacer rods 33. A sprocket 35 is attached to the side of back plate 31 facing bracket 28, 32, in position to mesh with chain 27. A bushing 37 supports the spindle and sprocket for rotation on a shaft 39 affixed to bracket 28, 32. When pulleys 40, 42 move in response to force applied to strip 24, arms mounted on their shafts actuate proximity sensors (not shown). In response, an electronic sequencer turns on motor 23 to rotate the separator spools. When the force on strip 24 diminishes, motor 23 is turned off.

To hold the spindle on shaft 39, a clamp plate 41 is slipped over the end of shaft 39 and biased against front plate 29 by a retainer mechanism 43. Depending on the desired width of separator strip 24, one of circumferential slots 43a, 43b will be engaged by a radially extending pin 45 mounted in retainer housing 47 and resiliently biased by a leaf spring 49 attached to housing 47. A bushing 51 supports housing 47 on shaft 39. A plurality of flat-headed shoulder screws 53 extend from the bottom of counter bores 53 in housing 47 through a spring socket 55, through a spring 57 and into threaded engagement with clamp plate 41. Springs 57 are retained between the bottom of the spring sockets 55 and clamp plate 41, thereby biasing plate 41 into contact with front plate 29. By raising spring 49, the retainer assembly 43 may be positioned on shaft 39 with pin 45 in one of grooves 43a, 43b. Roll 86 is supported by an identical spindle and retainer mechanism; however, drive motor 23, chain 27 and sprocket 35 are deleted. Friction between the back plate 31 and the bracket prevents roll 86 from overrunning when strip 84 is pulled by mechanism 82.

Figure 2:
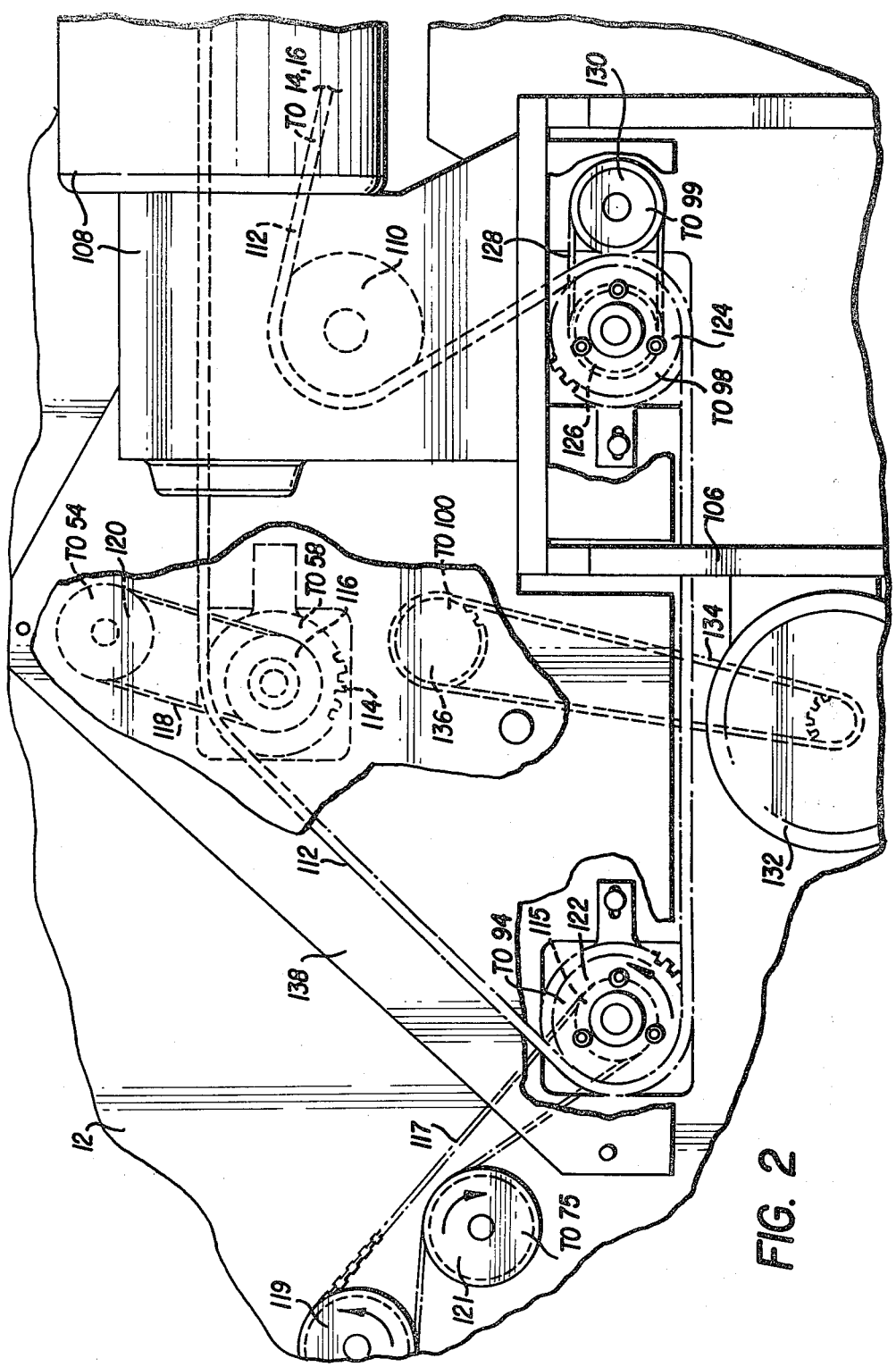
FIG. 2 shows a fragmentary rear elevation view, partly broken away, of the apparatus according to FIG. 1, indicating the drive train for the various conveyors used in the apparatus.

As shown in FIG. 2, the drive mechanism for conveyors 14, 16, 58, 74, 75, 98 and 99 is attached to the rear surface of base plate 12. A support bracket 106 holds a motor and transmission unit 108 having an output drive sprocket 110 (shown in phantom). A drive chain 112 passes over sprocket 110 to drive a sprocket connected to a clutch and brake assembly (not shown) which drives both conveyors 14 and 16. Chain 112 also drives a sprocket 114 which is connected via an appropriate clutch and brake assembly (not shown) to the drive roller of modular conveyor 58. Mounted on the output shaft of this clutch and brake assembly is a drive belt sprocket 116 (shown in phantom) over which a ribbed belt 118 is passed to drive a belt sprocket 120 operatively connected to separator drive roller 54. Chain 112 also drives a chain sprocket 122 which is operatively connected via a further clutch and brake assembly (not shown) to the drive roller 94 of modular conveyor 74. Mounted on the output shaft of this further clutch and brake assembly is a drive belt sprocket 115 (shown in phantom) over which a double-sided ribbed belt 117 is passed to drive an idler sprocket 119 and a drive sprocket 121, operatively connected to the drive roller of conveyor 75. Note that sprockets 115 and 121 rotate in opposite direction. A further chain sprocket 124 is driven by chain 112 and is operatively connected via another clutch and brake assembly (not shown) to the drive roller of modular conveyor 98. Mounted on the output shaft of this other clutch and brake assembly is a drive belt sprocket 126 (shown in phantom) over which a ribbed drive belt 128 passes to drive a further belt sprocket 130 operatively connected to the drive roller of modular conveyor 99. In one embodiment of the invention, a reversible drive motor 132 is mounted on bracket 106 to drive a further chain 134 which passes over a chain sprocket 136 operatively connected to the drive roller of separator take-up mechanism 100. Finally, a bearing plate 138 is mounted on and spaced from base plate 12 to support the shafts of the gear and chain assembly.

FIG. 3A shows that clamper-feeder mechanism 50 comprises an air cylinder 140 mounted on base plate 12 and provided with an actuator shaft 142. A bracket 144 is attached to shaft 142 for supporting clamping jaws 146, 148 which are biased apart by springs 150. An air actuator 152 is mounted on bracket 144 for closing jaws 146, 148 via its shaft 154. When strip 24 is to be fed toward the nip between rollers 54 and 56, jaws 146, 148 are closed by actuator 152 and cylinder 140 is actuated to advance mechanism 50 to the position shown in phantom. so that the tip of strip 24 extending from clamping jaws 146, 148 will be caught between rollers 54, 56 and pulled through when jaws 146, 148 open.

Situated just beneath mechanism 50 is cutter mechanism 52, which comprises an air cylinder 156 mounted on base plate 12 and provided with an actuator shaft 158. A bracket 160 is attached to shaft 158 for supporting a moving blade 162 having an angled cutting edge 163. Opposite to and aligned with blade 162 is a stationary blade 164 also mounted on base plate 12. The two blades are positioned so that when mechanism 50 is in its withdrawn position with jaws 146, 148 closed, blade 162 may be advanced to cut strip 24 and yet leave a tab of material extending from jaws 146, 148 for insertion between rolls 54, 56 during the next operating cycle.

The separator pressing roller 56 comprises a bracket 166 mounted on base plate 12. A guide rod 168 is slidably supported by bracket 166 and has attached to one end a roller support fork 170 within which roller 56 is mounted. A spring 172 biases roller 56 into contact with driven roller 54 before strip 24 is inserted. Finally, a relatively rigid plastic plate or tongue 174 is attached to the underside of bracket 166 to prevent the wrapped positive plate from curling upward above the surface of modular conveyor 58. To prevent excessive bending or working of the positive plate which could cause its electrochemical paste to come loose, the angle of conveyor 58 is typically about 30° above conveyor 74.

The separator folder mechanism 60 includes an air cylinder 176 mounted on base plate 12 and provided with an actuator shaft 178. A bracket 180 is attached to shaft 178 for supporting a flat, rigid separator folding blade 182 which extends toward the nip defined between drive roller 184 of conveyor 58 and pressing roller 56. In operation, mechanism 60 is actuated to extend folding blade 182 into contact with strip 24 so that it folds between rollers 56 and 184 just before a positive plate 186 is moved between rollers 56 and 184 by modular conveyor 16. See FIG 3B. Thus, the leading edge of the folded separator material extends a distance "a" of approximately one-quarter inch beyond the end of the positive plate 186 when the two have been combined between rollers 56 and 184, as illustrated in FIGS. 3C and 3D. The significance of this offset between plate 186 and its wrappers will be explained with reference to FIG. 7H. The wrapped positive plate then proceeds until its leading edge reaches sensor 72, as previously discussed, at which time conveyor 58 is stopped until a wrapped negative plate has been prepared. Later, when the wrapped positive plate leaves conveyor 58, it passes beneath a hold-down roller 188 pivoted to base plate 12 by an arm 190, before passing beneath the drive roller 191 of stack-holder conveyor 75, which drives a ribbed belt 193.

As shown in FIGS. 3A-3D, the apparatus according to the invention is configured to wrap a positive battery plate with a double thickness strip 24 of separator material. Of course, it would also be within the scope of the invention to wrap the negative and positive plates with a single thickness of separator material, with essentially equal effect. However, to permit heat sealing of the completed battery roll, it is preferred to wrap the positive plate with conventional separator material and to wrap the negative plate with a strip of very thin, thermoplastic material. This thin strip 84 also functions as an additional separator in the completed battery but mainly facilitates heat sealing of the roll, provided the negative plate is outermost as the roll is wound.

FIG. 4A illustrates the apparatus for conveying and wrapping a negative plate as used in the present invention. Negative plates moving on modular conveyors 98, 99 pass beneath a hold-down roller 192 pivoted to base plate 12 by an arm 194, just ahead of the outfeed end of modular conveyor 98. Similarly, negative plates reaching the infeed end of modular conveyor 74 pass beneath a hold-down roller 196 pivoted to base plate 12 by an arm 198 and positioned to ride on top of drive roller 94 of conveyor 74. Clamper-feeder mechanism 82 is essentially identical to mechanism 50 an comprises an air cylinder 200 attached to base plate 12 and provided with an actuator shaft 202. A bracket 204 is attached to shaft 202 for supporting a pair of clamping jaws 206, 208 which are biased open by springs 210. An air actuator 212 also is mounted on bracket 204 for closing jaws 206, 208 via its shaft 214.

Figure 4B:
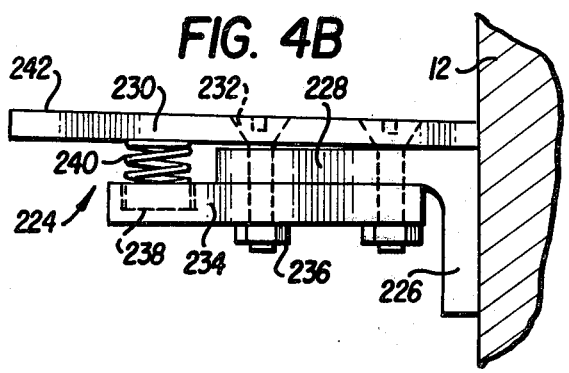
FIG. 4B shows an enlarged view of the fixed cutting blade used to sever the separator material in the apparatus according to FIG. 4A.
Figure 4C:
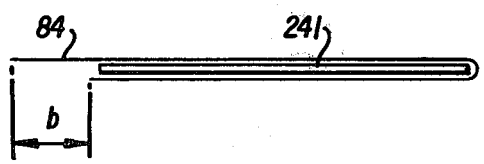
FIG. 4C shows a side view of a negative battery plate as wrapped by the apparatus according to FIG. 4A.

Cutter mechanism 93 is essentially identical to cutter mechanism 52 in that it comprises an air cylinder 216 attached to base plate 12 and provided with an actuator shaft 218. A bracket 220 is attached to shaft 218 for supporting a moving blade 222 having an angled cutting edge 223. However, opposite to and aligned with moving blade 222 is a resiliently mounted blade assembly 224, illustrated in FIG. 4B, which is preferred to facilitate cutting the typically thin, slippery material of strip 84. Blade assembly 224 comprises an angled bracket 226 attached to base plate 12 and provided with an outwardly extending leg 228 which supports a cutting blade 230 by means of a pair of screws 232 or the like which extend through leg 228 and secure a spring plate 234 to the underside of leg 228 by means of a pair of nuts 236. Preferably, approximately 0.030 inches play is allowed between leg 228 and blade 230. A spring pocket 238 is provided on the upper surface of spring plate 234 to secure a spring 240 between the outer ends of plate 234 and blade 230. The top surface 242 of blade 230 is essentially aligned with the bottom surface of moving blade 222. This arrangement permits thin, relatively slippery materials, such as polyester materials suitable for strip 84, to be cut quickly by a sort of scissor action. FIG. 4C shows that negative plate 241 preferably is wrapped so that the uppermost portion of the wrapper extends a distance "b" beyond the trailing edge of the lowermost portion. This extra length provides adequate wrapper for heat sealing, as will be discussed hereinafter. The lead edge of plate 241 abuts the lead edge of its wrapper.

Finally, FIG. 4A shows that pressing roller 96 is pressed against roller 94 by an air cylinder 97. A centrally located circumferential groove is provided in roller 96 and an air tube 225 extends around the roller in this groove. The upper end of tube 225 terminates just below the upper edge of infeed modular conveyor 98. Clamping jaw 206, on the opposite side of strip 84, also includes an air passage 207 (shown in phantom) through which air is directed toward the nip between rollers 94 and 96 when mechanism 82 is advanced. In operation, a stream of air through passage 207 deflects strip 84 into the nip and a steam through tube 25 prevents strip 84 from folding over onto conveyor 98 and directs it into the take-up mechanism 100.

Figure 5A:
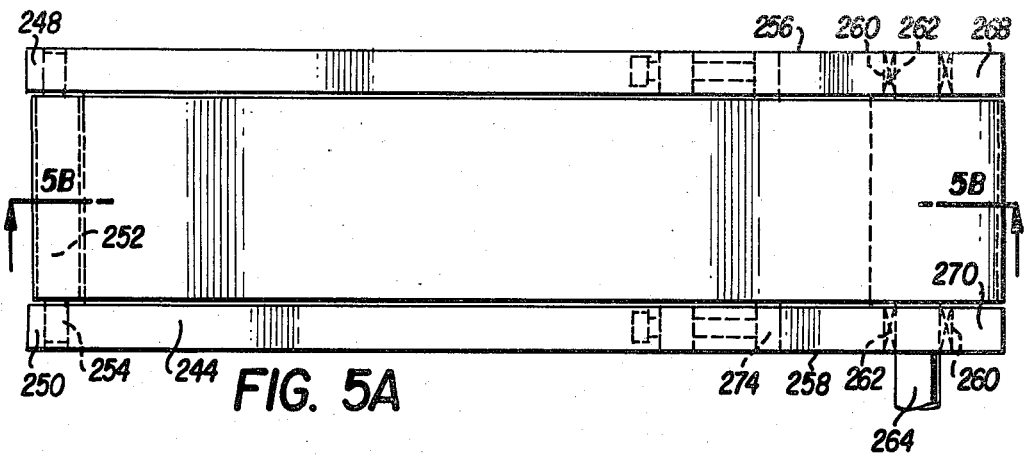
FIG. 5A shows a plan view of a modular conveyor according to the present invention, of which 6 identical units are used in the apparatus according to FIG. 1.
Figure 5B:
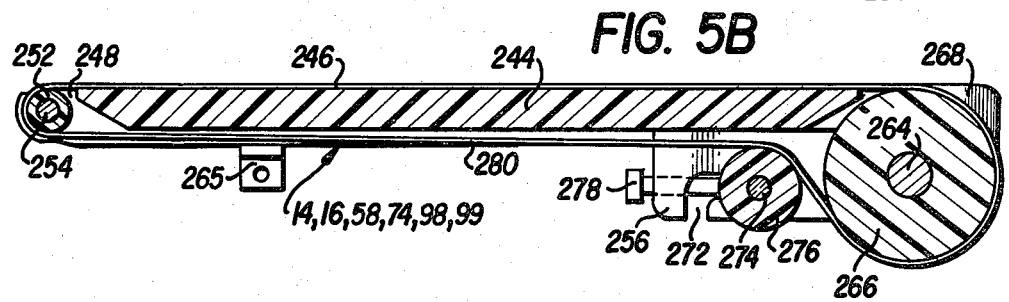
FIG. 5B shows a sectional view taken along line 5B—5B of FIG. 5A.

FIGS. 5A and 5B illustrate the structure of the modular conveyor used to move wrapped and unwrapped battery plates through the apparatus according to the present invention. An elongated, essentially rectangular frame or bed 244 is provided, for example made of a rigid plastic such as Delrin or the like, which has a high degree of lubricity. Frame 244 preferably has a flat upper surface 246 so that the pasted plates will not be flexed during movement. A pair of parallel roller support arms 248, 250 extend from one end of frame 244 in position to support a small idler roller 252, for example of one-half inch diameter, on a transverse shaft 254 via suitable bearings (not illustrated). Roller 252 is sized to permit close access to winding mechanism 78 at the outfeed end of conveyor 74. On the underside of frame 244, a pair of elongated bearing blocks 256, 258 are mounted on opposite sides of frame 244, each block comprising a bore 260 for receiving a bearing 262 to support a transverse shaft 264 on which a knurled drive roller 266, for example of approximately two inch diameter, is mounted. The large diameter of roller 266 ensures that rather thin belts and low belt tension may be used due to the large area for frictional engagement with the belt. The belt may be run in either direction with low power consumption due to the low tension. The uppermost point of roller 266 extends through an opening defined between parallel support arms 268, 270 so that upper surface 246 of frame 244 and the uppermost portions of rollers 252 and 266 are essentially coplanar. Blocks 256, 258 also comprise a J-slot 272 within which the ends of transverse shaft 274 are positioned, on which shaft a take-up roller 276, for example of approximately one inch diameter, is mounted via suitable bearings (not shown). Adjustment screws 278 are provided through appropriate tapped bores in blocks 256, 258 in position to contact and adjust the position of shaft 274 toward and away from roller 266. A flat belt 280, typically two and one-half inches wide and twenty-five inches long, extends along flat surface 246, around idler roller 266, over take-up roller 276 and around drive roller 252. By adjusting the position of roller 276, the wrap angle of belt 280 around roller 266 can be increased to nearly 270°, to maximize the frictional engagement between the belt and roller 266. For ease of clean-up a polyurethane coated belt is preferred, but not required. By adjusting the tension in belt 280, the modular conveyor according to the invention may be arranged to operate with drive roller 266 rotating in either direction, a feature which facilitates mounting of the modular conveyors in either direction, as shown in FIGS. 1, 3A and 4A. In use, the conveyor is supported by an extension of shaft 264 and a simple bracket 265, so that the angle of the conveyor is easily adjustable by swinging it around shaft 264 and repositioning bracket 265.

Figure 6A:
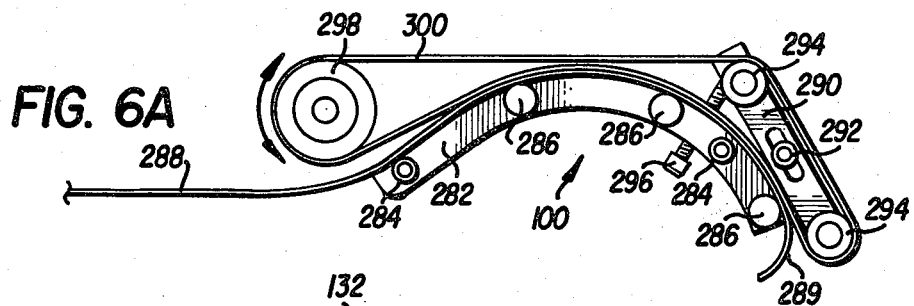
FIG. 6A shows an elevation view of a driven separator conveyor.
Figure 6B:
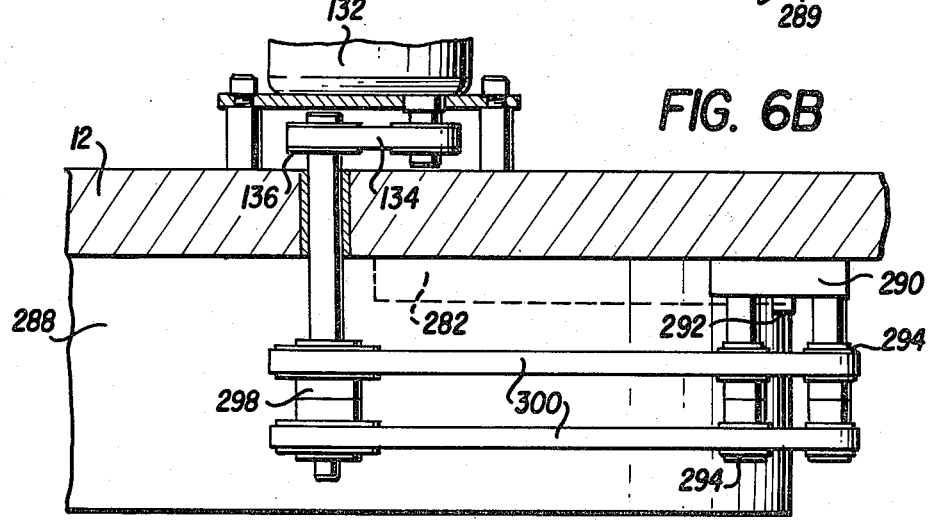
FIG. 6B shows a top view of the conveyor shown in FIG. 6A.

FIGS. 6A and 6B illustrate one embodiment of a suitable take-up mechanism 100 for wrapper strip 84. A thin strip of polyester material has little stiffness, thus it must somehow be conveyed beyond rollers 94, 96. In this embodiment, an upwardly curved plate bracket 282 is mounted to base plate 12 by means of screws 284. Extending outwardly from the front of the machine along bracket 282 are support pins 286 over which is positioned a curved support plate 288 which may be made from brass shim plate or the like. Plate 288 is flared at the inlet end 289 so as to guide strip 84 into mechanism 100, with assistance from the air blast leaving tube 225. A belt tensioner bracket 290 is pivotably mounted to base plate 12 by means of a screw 292. On the ends of bracket 290 are provided bronze idler pulleys 294. An adjustment screw 296 is threaded through an appropriately positioned tapped hole in bracket 282 into contact with the underside of bracket 290. On the opposite side of the crest of support plate 288 from tensioner bracket 290 is located a knurled drive roller 298 which is driven by reversible motor 132, also shown in FIG. 2. One or two flat belts 300 are threaded around drive roller 298, over plate 288 and around rollers 294 so that strip 84 may be driven onto and from plate 288 during operation.

FIGS. 6C and 6D illustrate a preferred form of take-up mechanism for wrapper strip 84. In this case, elements 290-300 have been eliminated. A plastic spacer plate 302 extends along the top of bracket 282. A curved cover plate 304 is attached to bracket 282 through spacer plate 302 by means of appropriate fasteners. The outer edge of cover plate 304 is joined to plate 288 by means of a solder or braze bead 306 as shown in FIG. 6D. Thus, a narrow channel is defined between plates 288 and 304. A flared mouth 308 is provided at the inlet ends of plates 288 and 304 to receive strip 84 as it proceeds from rollers 94, 96 with the assistance of the air blast from tube 225. It is preferred that plates 288, 304 be made from an electrically conductive material so that any static electricity on polywrap strip 84 will be dissipated.

Turning now to FIGS. 7A-7H, the structure and function of the roll winding portion of the invention may be understood. In operation, positive plate 186 and its wrapper 24 are fed from conveyor 58 so that the leading edge of negative plate 241 and its wrapper 84 are a distance "c", for example approximately one-quarter inch, ahead of the leading edge of folded separator strip 24. As shown in FIG. 3D, the leading edge of separator 24 is a distance "a" ahead of the leading edge of plate 186. This spacing of leading edges provides a somewhat tapered leading edge for a sandwich comprised of the two wrapped plates. The spacing of the leading edges of the plates, irrespective of the positions of their wrapper, ensures that proper tab alignment is achieved in the completed roll. The actual magnitude of distance "c" is controlled by adjusting the position of sensor 72 along conveyor 58. See also FIG. 3A.

As shown in FIGS. 7A and 7B, the sandwich of positive and negative plates passes beneath belt 193 of stackholder conveyor 75 which is held down by a hold-down roller 310 pivoted to base plate 12 on an arm 312. Belt 193 also passes around a pair of idler rollers 314, 316 mounted on a tension adjustment bracket 318. Belt 193 and rollers 310 and 314 thus hold the stack or sandwich of plates in proper position as it is conveyed to winding mechanism 78, and then push the stack into the winding mechanism.

Figure 7D:
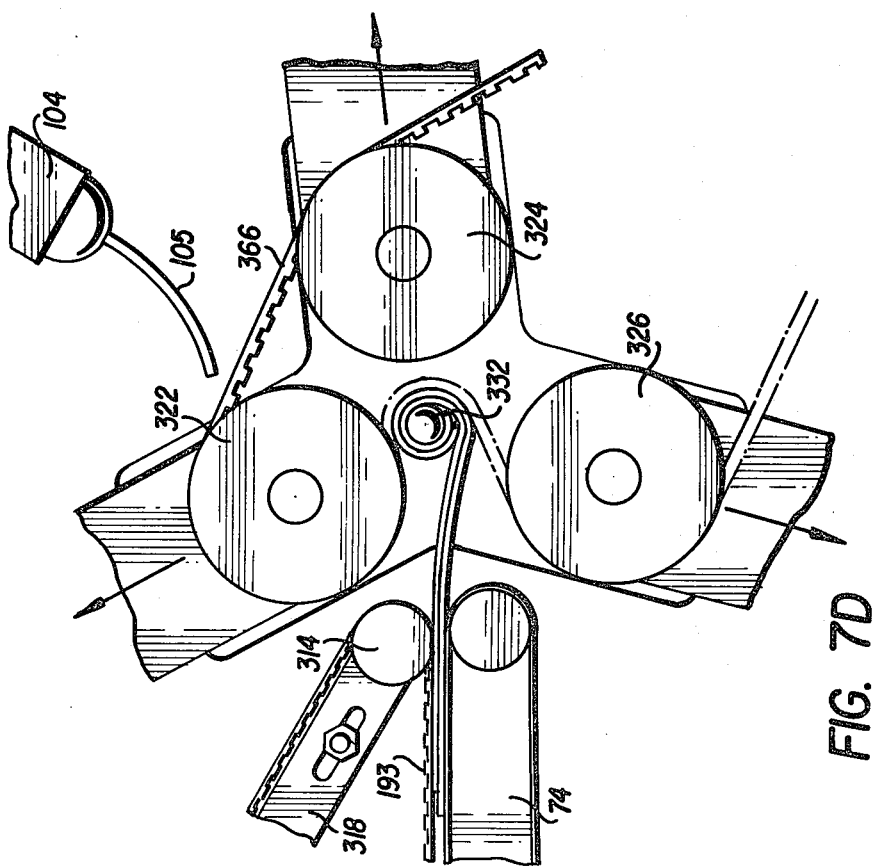
FIG. 7D shows an enlarged view of the winding rollers, guide belt, arbor and battery plate sandwich as they cooperate during actual winding.
Figure 7E:
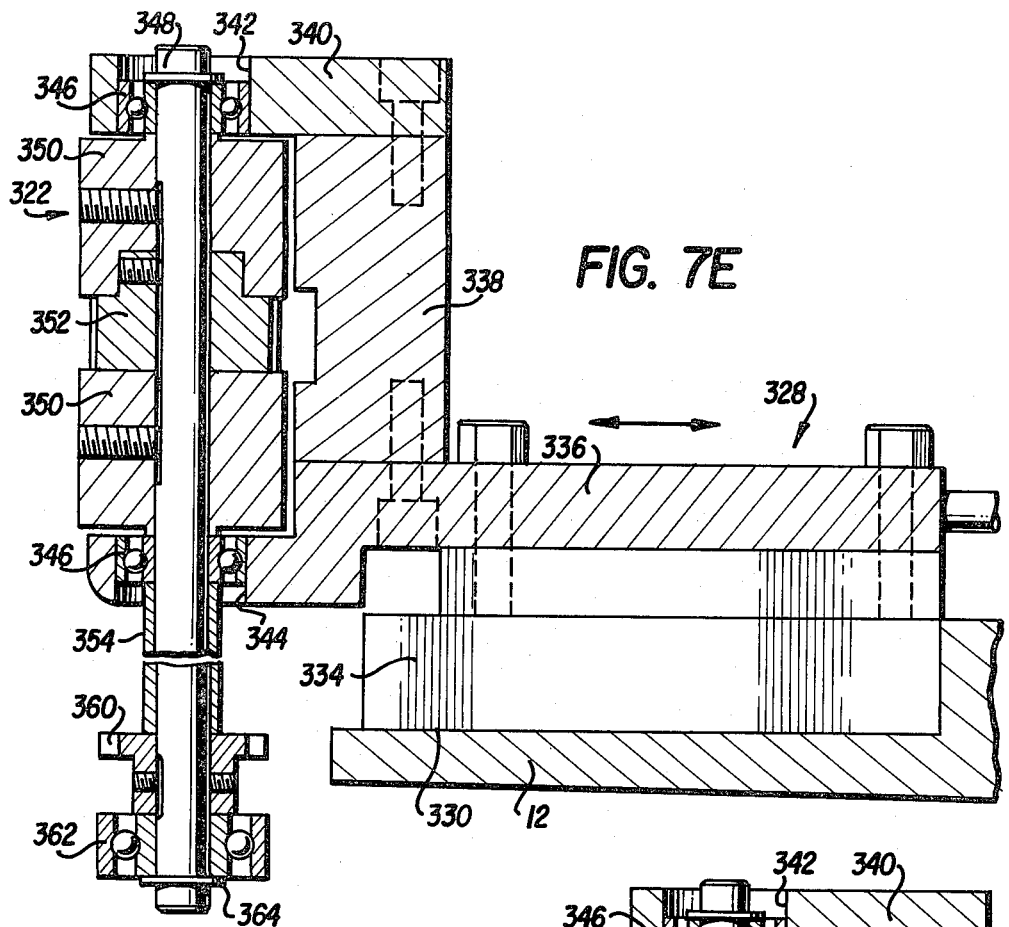
FIGS. 7E–7G show sectioned views of the winding roller structure used in the invention.
Figure 7G:
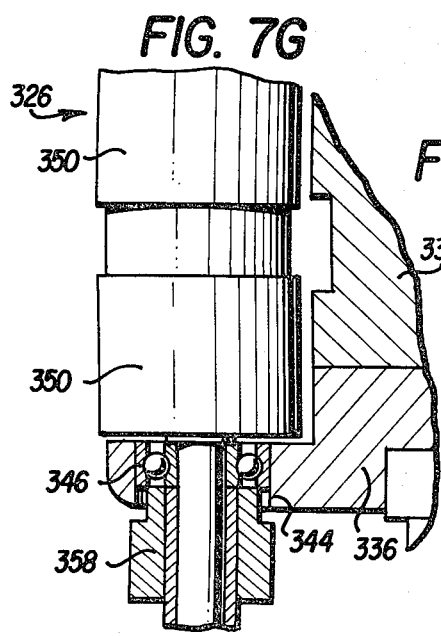
Figure 7F:
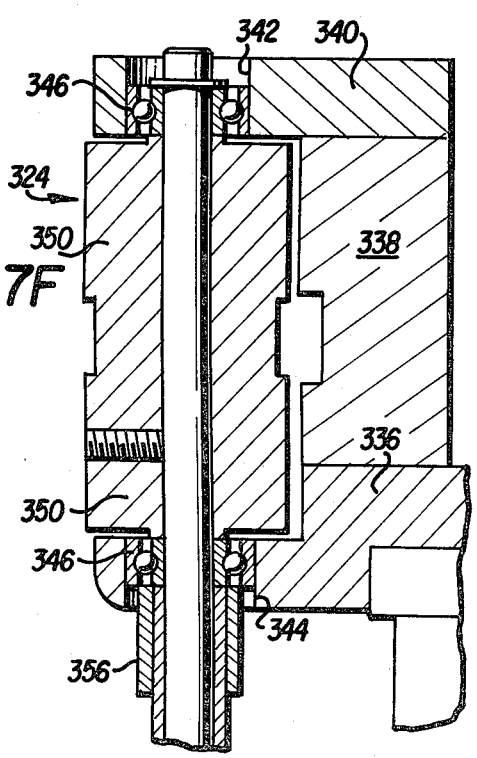

Preferably three winding rollers 322, 324, 326 are included in winding mechanism 78, each roller mounted on a slide assembly 328 of the type shown in FIGS. 7E, F and G. Each slide assembly 328 comprises a slot 330 cut into base plate 12 and oriented radially outwardly from a winding arbor 332. Each slot 330 supports a roller slide 334 to which is attached a guide bracket 336 having affixed thereto an outwardly extending support block 338. A roller bracket 340 is attached to block 338 at its outer end and includes a through bore 342 which is aligned with a similar bore 344 provided at the radially inner end of guide bracket 336. A pair of bearings 346 mounted in bores 342, 344 support a shaft 348 which is parallel to arbor 332 and on which are mounted rollers 350. On roller 322 only, rollers 350 are located on either side of a toothed roller pulley 352. Rollers 324 and 326 include a smooth surfaced groove between rollers 350. On the opposite side of bracket 336 from rollers 350, a cantilevered portion of shaft 348 is surrounded by one or another of shaft spacers 354, 356, 358 which separate rollers 52 from arbor 332 by appropriate distances, as will be discussed with reference to FIG. 7H. Shaft 348 also carries a roll drive chain sprocket 360 and a cable wrap bearing 362, all secured to the shaft by means such as a retainer ring 364. Toothed roller pulley 352 is meshed with a toothed belt 366 which extends from roller 322, around arbor 332 with its smooth side facing the arbor, around roller 326 and outward to a toothed idler pulley 368. To maintain the staggered leading edge of the stack of plates, the tangential velocity of belt 366 and rollers 322-326 should equal the linear velocity of conveyors 74 and 75, and preferably should be constant. A ball slide 370 supports pulley 368 for rotation. The actuator rod 372 of an air cylinder 374 is pivotably attached to ball slide 370 in order to adjust belt tension. Thus, as the stack of wrapped plates is pushed between rollers 322, 326, its leading edge eventually slips between arbor 332 and belt 366, as illustrated in FIG. 7D, so that the stack is pulled into the winding mechanism. Although an endless guide belt driven by one of the winding rollers is preferred, a simple belt segment threaded around arbor 332 and suitably tensioned may also be used without departing from the scope of the invention.

FIG. 7H illustrates a view from the rear of the winding rollers, illustrating how shaft spacers 354-358 position rollers 322, 324, 326 relative to arbor 332. As the stacked plates approach the winding mechanism, the leading edge of plate 241 and wrapper 84 is approximately one-quarter inch ahead of the leading edge of wrapper 184 (spacing "c") and approximately one-half inch ahead of the leading edge of plate 186 (spacing "a" plus spacing "c"). This arrangement serves two purposes: (a) the stack is tapered at its leading edge to facilitate insertion into the winding mechanism; and (b) the leading edges of the plates are offset as necessary to ensure that their electrode tabs (not illustrated) will be properly aligned at one end of the completed roll.

To provide room at the start of winding for the leading edge of the stack to be inserted between the belt, rollers and arbor, the radial thickness of spacer 354 is chosen such that the radial clearance of roller 322 to arbor 332 is approximately equal to the total thickness of plate 241 and wrapper 84; the radial thickness of spacer 356 is chosen so that the radial clearance of roller 324 to arbor 332 is approximately equal to the total thickness of wrapper 84, plate 241 and a double thickness of wrapper 24; and the radial thickness of spacer 358 is chosen so that the radial clearance of roller 326 to arbor 332 is equal to the thickness of the entire stack of wrapped plates. To ensure adequate engagement of the stack, the diameter of the arbor preferably is twice the sum of spacings "a" and "c". Thus, were spacers 354-358 not used, rollers 350 would rest on arbor 332 at the start of winding. This would make insertion of the stack of plates very difficult to achieve. However, in the present invention the radial spacing of rollers 350 from arbor 332 is widest at roller 326 and narrowest at roller 322 to ease insertion. The angle of belt 366 across the path of the plate stack may be varied to ease insertion; however, approximately 20° to 30° below the path has been found to be preferable. As winding proceeds, the tension in belt 366 increases with increasing roll diameter, eventually actuating the mechanism shown in FIGS. 8 and 9.

Figure 8:
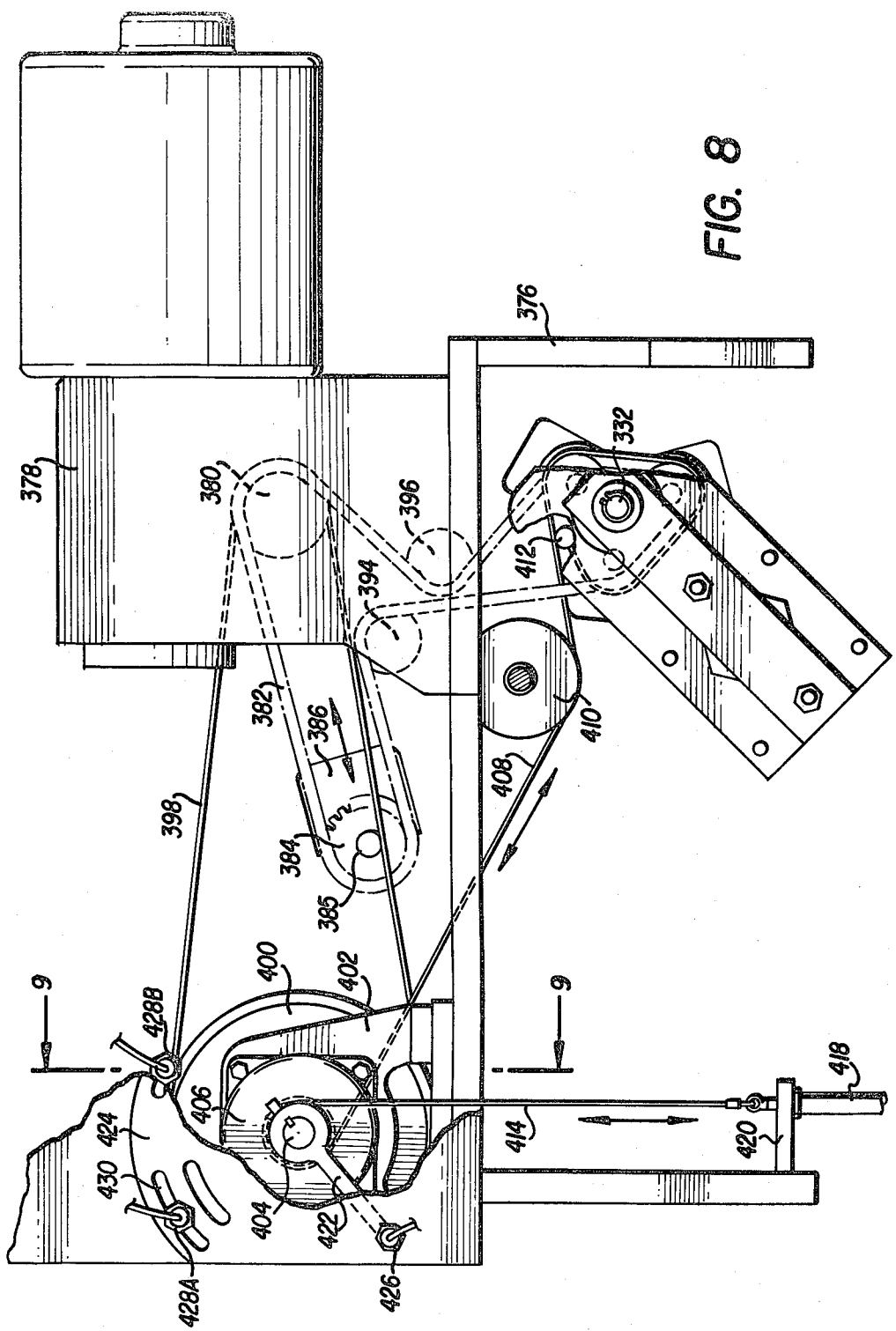
FIG. 8 shows a fragmentary rear elevation view, partially broken away, of the apparatus according to FIG. 1, indicating the drive train for the winding rollers and portions of the mechanism for controlling the diameter of the completed roll.

FIG. 8 shows a fragmentary rear elevation view of the apparatus illustrated in FIG. 1 indicating the drive train for the winding rollers 322-326 and the mechanism according to the invention which controls the final diameter of the wound roll. A bracket 376 is attached to base plate 12 and supports a motor and transmission unit 378 which drives a chain sprocket 380 (shown in phantom). A drive chain 382 is directed over chain sprocket 380 and passes around a tension adjustment sprocket 384 mounted on a shaft 385. A hole 386 in plate 12 permits shaft 385 to extent to the back plate 12 from a slider 388 mounted on the front face of plate 12. The actuator rod 390 of an air cylinder 392 is pivotably attached to slider 388 in order to adjust the tension in chain 382 during operation. See also FIGS. 1A and 7A. From sprocket 384, chain 380 passes over an idler sprocket 394 and then around at least one though preferably all of the three roll sprockets 360, over a further idler sprocket 396 and back to drive sprocket 380. At least roller 322 must be driven to start the winding but the driven roller(s) is driven at constant speed. On the same shaft with sprocket 380 is mounted a gear belt pulley (not illustrated) which drives a gear belt 398. A gear belt pulley 400 is driven by belt 398 and operatively connected to an electrically actuated clutch brake assembly 402 having an output shaft 404. As also shown in FIG. 9, a cable drum 406 is mounted for rotation with shaft 404 and a cable 408 is wound at constant diameter on drum 406. The outermost end portion of cable 408 extends from drum 406 beneath an idler pulley 410 and then around cable wrap bearings 362 to an anchor point 412 attached to base plate 12. Tension is maintained on cable 408 to maintain its position on cable wrap bearings 362. A roller return cable 414 is attached at one end to an enlarged boss 416 of drum 406 and at the other end to a pneumatic spring tensioner 418 mounted to base plate 12 on a bracket 420. On the outer end of shaft 404 is mounted a roll diameter sensor arm 422. An apertured sensor plate 424 is mounted adjacent arm 422 and includes a fixed initial or "home" position sensor 426, such as a proximity switch, and one or more variable position finish sensors 428A, 428B, mounted in arcuate slots 430 to permit adjustment of their positions for different battery diameters.

In operation, the sandwich of positive and negative plates is pushed beneath arbor 332 as shown in FIG. 7D and is caught between the belt and the arbor and drawn around the arbor by the rollers 350, as illustrated. As the tension in belt 366 increases due to the presence of the partially wound roll, a sensor 431 such as a reed switch located at cylinder 374 is actuated by movement of the piston in cylinder 374. In response to this, tensioner 418 releases and clutch-brake assembly 402 engages to permit drum 406 to rotate and pay out cable 408. Rollers 322, 324 and 326 thus are permitted to move radially away from arbor 332 on bearing slides 334. As cable 408 is paid out, arm 422 rotates away from sensor 426 and eventually reaches one of sensors 428A, 428B, which indicates that the desired roll diameter has been reached. Since cable 408 prevents rollers 322-326 from moving out at other than a predetermined rate or beyond a predetermined distance, the diameter of the resultant wound battery core will be fixed within predetermined limits. After sensor 428A, 428B has been actuated, the ejector mechanism according to the invention is set into motion to remove the completed roll from arbor 332.

In order to properly size the components of the diameter control mechanism shown in FIGS. 8 and 9, it is preferable to choose an initial circumferential or tangential velocity for rollers 350, such as 60 feet per minute. The speed should be low enough to avoid jamming the plate stack between the arbor and the belt, before the control system has time to release belt tension. Then for a given length of plates 186 and 241, the number of roller rotations required to completely wind a roll on a given arbor diameter can be determined. A desired degree of rotation of drum 406 between sensors 426 and 428A, 428B is then chosen, typically less than one revolution. The necessary radial displacement of rollers 350 to produce a given roll diameter can be determined by direct measurement or calculation, as can the length of cable 408 required to pass around bearings 362 in their displaced positions. Having this length of cable and the desired degree of rotation of drum 406, the diameter of the drum can be determined on which the cable is wound in a single layer. The gear ratios of sprockets 360, 380 and 400 then can be set so that the rate of payout of cable 408 will match the rate of increase in diameter of the roll dictated by the velocity of the winding roller. Because the payout of cable 408 is controlled in this manner, as is radial movement of rollers 350, the final roll diameter will be within desired limits.

As shown in FIG. 10, the ejector mechanism supports the freely rotatable winding arbor 332. An actuator plate 432 is attached to the back of base plate 12 by means of a plurality of support rods 434. An air cylinder 436 extends through an opening 438 provided in base plate 12 and is attached to actuator plate 432 at threaded bore 440. The actuator rod 442 of air cylinder 436 is attached to an actuator slide plate 444 which is slidably mounted via a ball bushings 445 on a pair of guide rods 446. A support plate 448 is secured by guide rods 446 to the back side of actuator plate 432. Winding arbor 332 is rotatably mounted on an extension 450 of support plate 448. A through bore 452 surrounds a bearing 454 to support the rearmost end of winding arbor 332. Shaft retainers 456 hold arbor 332 against axial movement. At its forward end, arbor 332 includes a smaller diameter portion 458 on which the battery cores are wound, as indicated in phantom. Surrounding the rear, larger diameter portion of arbor 332 is an essentially cylindrical ejector slide 460 having an axial bore which permits slide 460 to move along arbor 332. A large diameter central portion of slide 460 is supported by a ball bearing 464 which permits slide 460 to both rotate and move axially on arbor 332. As indicated in FIG. 10, ball bearing 464 is mounted in a bore 465 provided at one end of actuator plate 432.

At its rearmost end, slide 460 includes a smaller diameter portion 466 which fixedly supports a retainer ring 468, thereby defining an annular slot 470. A rotating cam follower 472 is attached to one end of actuator slide plate 444 so that its follower extends into annular slot 470. At the forward end of slide 460, a reduced diameter portion 474 surrounds an arbor bearing 476 which rotatably supports arbor 332. The external diameter of portion 474 is threaded to receive a bearing cap 478 having a cylindrical outer collar 479 against which shaft spacers 354, 356 and 358 rest at the commencement of winding of a battery core, as shown in FIG. 7H. The outer diameter of collar 479 approximates the outer diameter of the spiral roll to be wound. By changing the outer diameter of collar 479 and spacers 354-358, changes in the thickness of stack of plates may be accommodated.

In operation, when the winding of a particular battery core has been completed, one of position sensors 428A, 428B causes air cylinder 436 to retract, thereby drawing actuator shaft 442 to the right as illustrated in FIG. 10, causing cam follower 472 to bear against slide 462 and bearing cap 478 to push against the completed roll so that its slides off arbor 332. Prior to actuation of cylinder 436, however, heat sealer 104 is moved into contact with the outer surface of the completed roll so that a pair of flexible heated fingers 105 contact the rotating roll and fuse a circumferential band of wrapper 84 at each end of the roll to secure the roll against unwinding. Fingers 105 may be made from brass shim stock and heated by conventional techniques such as resistance or induction heating. As shown in FIG. 7A, movement of heat sealer 104 is controlled by an air cylinder 480 attached to the front surface of base plate 12.

Figure 11:
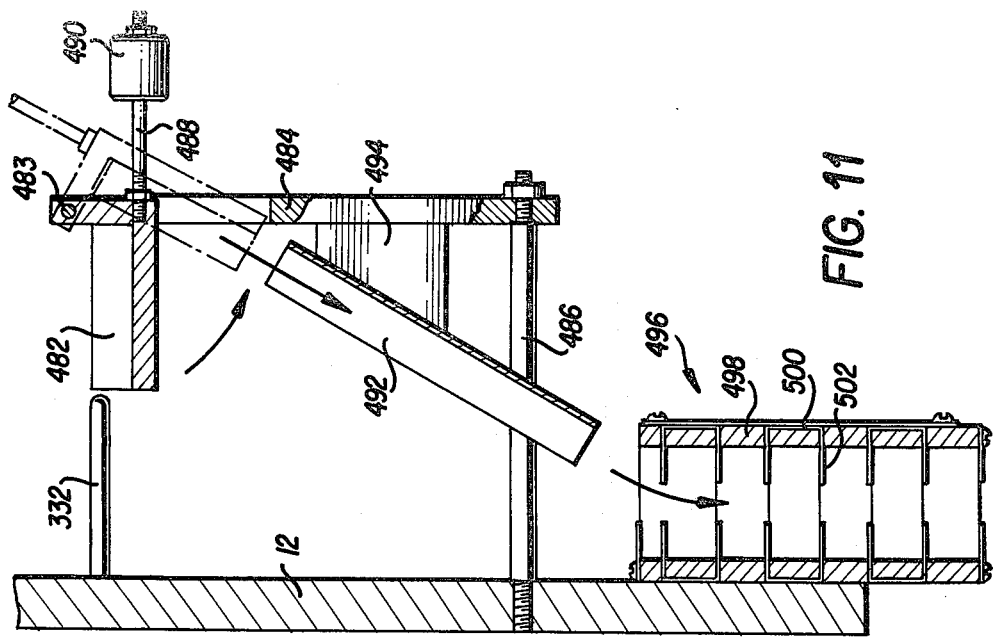
FIG. 11 shows an elevation, partially sectioned view of the unloading mechanism used to receive completed rolls following their ejection from the winding arbor.

As the completed battery core slides off arbor 332, it is cradled by a roll unloading mechanism as illustrated in FIG. 11. This mechanism is not included in the views of FIGS. 1 and 7A, for purposes of clarity of illustration. A semi-cylindrical plastic or metallic nest 482 is pivoted at 483 to a bracket 484 attached to base plate 12 by appropriate mounting rods 486. Extending from nest 482 is a shaft 488 on which a counterweight 490 is adjustably positioned so as to maintain nest 482 in a horizontal position for receiving each completed roll. The weight of the completed roll causes the nest to pivot to the phantom position illustrated in FIG. 11 in which the roll is allowed to slide from nest 482 onto a semi-cylindrical slide 492 which is attached to bracket 484 by a suitable bracket 494. The roll then drops through a damper assembly 496. An essentially rectangular box or housing 498 is made from segments between which relatively stiff plastic strips 500 are secured so that a plurality of inwardly extending tabs 502 are provided in the central passageway of housing 498. Thus, as the roll drops through the housing, the tabs impede its motion so that it drops at a reasonable velocity into an associated conveyor, not illustrated.

FIGS. 12, 13A, 13B and 13C illustrate the pneumatic and electrical control circuitry used in the present invention.

Figure 12:
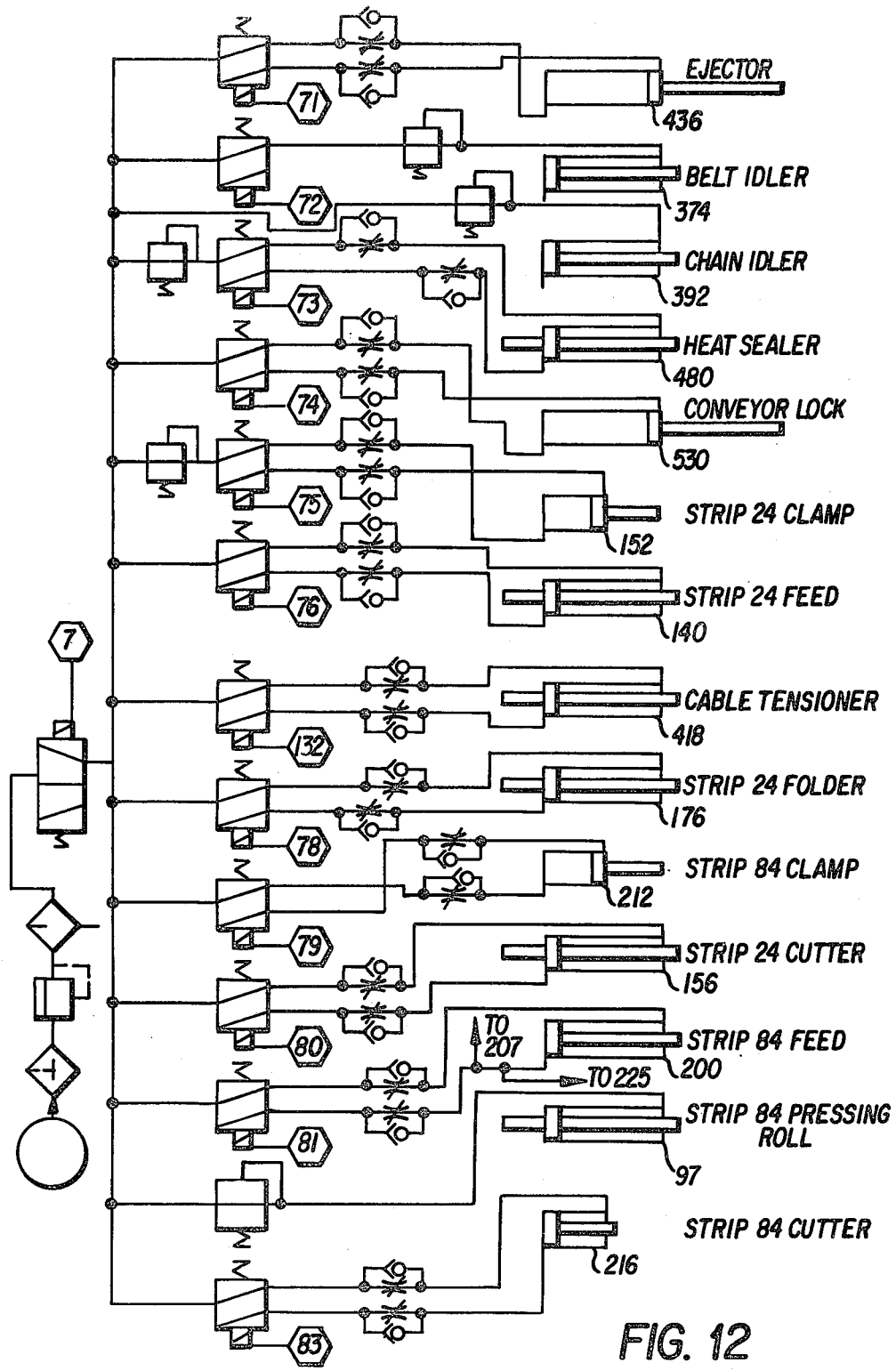
FIG. 12 shows schematically the pneumatic control circuitry used with the apparatus shown in FIGS. 1–11.

In FIG. 12, the various air cylinders have been numbered to correspond to the cylinders shown in the other Figures. The various solenoid valves illustrated schematically are indicated to be actuated over numbered electrical lines which correspond to electrical lines in the diagrams of FIGS. 13A-C. The "lines" referred to in the following description are identified by appropriate numerals in hexagonal cartouches in FIGS. 12 and 13A-13C. FIG. 13A shows the power connections between the various components of the electrical controller, including a conventional programmable sequencer 504, such as one of the 5TI6MT series made by Texas Instruments. FIG. 13B shows the various connections to the inputs of sequencer 504 and FIG. 13C shows the connections to the outputs of sequencer 504. In practice, a sequencer 504 has been programmed to operate the disclosed apparatus in accordance with the following sequence of operation; however, conventional switch, relay and timer systems also may be used.

The apparatus is set up by positioning rolls 26, 30 and 86 on their respective spindles. Separator strip 24 is formed and threaded through open jaws 146, 148 of retracted mechanism 50, leaving about a one-half inch tab of material projecting belong the jaws. Sensor 48 thus will indicate its presence. Strip 84 is similarly threaded through retainer 91, past sensor 92 and through jaws 206, 208 of mechanism 82. Pasted positive and negative battery plates are made available for feeding to modular conveyors 14 and 99. Separator sensor 48 acts to close line 57 in FIG. 13B; and sensor 92 opens line 58. Sensor 72 opens line 56 to indicate the absence of a wrapped positive plate. Conveyors 14, 16 and 58 are turned off by outputs on lines 63, 64 and 67, 68, respectively. Separator folder retracted switch 508 is closed in line 42; and separator cutter retracted switch 510 is closed in line 44.

When the previous conditions exist and switch 506 is closed in line 37, sequencer 504 turns on conveyor 58 and roller 54 by outputs on lines 67, 68. Jaws 146, 148 are closed by cylinder 152 when its solenoid valve is actuated by an output on line 75. Cylinder 140 is advanced when its solenoid valve is actuated by an output on line 76, thereby inserting the end of strip 24 into the nip between rolls 54, 56. At that time separator feeder advanced switch 512 on line 39 is closed, in response to which cylinder 140 is retracted and jaws 146, 148 open in response to outputs on lines 76 and 75, respectively. Rolls 54, 56 feed strips 24 onward until its leading edge passes the desired one of separator length sensors 68, 70 in line 55, whereupon sequencer 504 stops conveyor 58 in response to an output on lines 67, 68. Simultaneously, conveyors 14 and 16 are started by outputs on lines 63 and 64; separator folder cylinder 176 advances when its solenoid valve is actuated by an output on line 78, to fold strip 24 into the nip between rolls 54, 56. After a time delay, triggered by one of sensors 68, 70, cylinder 176 is retracted by an output on line 78. The system now waits for a positive plate to arrive on conveyor 16.

When the leading edge of a positive plate reaches sensor 22 in line 53, sequencer 504 starts a time delay to allow plate 186 to approach the nip and then conveyor 58 is turned on by outputs on lines 67 and 68. The plate then passes into the fold previously made in strip 24, leaving about one-quarter inch between its leading edge and the edge of the fold. See FIGS. 3B-3D. When the trailing edge of the plate passes sensor 22, sequencer 504 advances cylinder 156 by actuating its solenoid valve with an output on line 80, thus cutting strip 24 to appropriate length. After a time delay, cylinder 156 is retracted by an output on line 80, thus closing switch 510. When the leading edge of the sandwich formed of the positive plate and separator reaches sensor 72 on line 56, sequencer 504 stops conveyors 14, 16 and 58 by signals on lines 63, 64 and 67, 68. The system now waits for a negative plate to arrive on conveyors 98 and 99.

Before conveyors 98 and 99 may be started, sensor 92 must indicate the presence of strip 84, thus opening line 58; strip 84 cutter returned switch 520 must be closed on line 51; strip 84 feeder cylinder 200 must be retracted; and jaws 206, 208 must be closed. Then, when start switch 526 is closed on line 46, conveyors 74 and 75 will be started by output on lines 69 and 70. Simultaneously, cylinder 200 is advanced by an output to its solenoid valve on line 81, which also causes a blast of air to issue from tube 225 and passage 207; whereby strip 84 is inserted into the nip between rollers 94 and 96. When feeder advanced switch 528 is closed on line 48, clamping jaws 206, 208 are opened by cylinder 212 which is actuated by an output to its solenoid valve on line 79. Strip 84 then feeds past rollers 94, 96 and the air jet pushes it into the mouth of the pick-up mechanism 100.

Sequencer 504, after a predetermined time delay to allow an appropriate length of strip 84 to enter pick-up 100, stops conveyors 74 and 75 by signals on lines 69, 70. Conveyors 98, 99 are started by outputs on lines 65 and 66 to feed a negative plate. Mechanism 100 is also stopped by an output on line 77, if the embodiment of FIGS. 6A and 6B is used. After a further delay, cylinder 200 is retracted by an output on line 81, causing the jaws 206, 208 to be withdrawn and the air jets from tube 225 and passage 207 to cease. Jaws 206, 208 remain open.

When the leading edge of a negative plate reaches sensor 102 on line 54, conveyors 98, 99 are stopped. Then when switch 426 in line 30 is closed to indicate that rollers 322, 324, 326 have returned to arbor 332 and when sensor 72 in line 56 is actuated to indicate the presence of the positive sandwich on conveyor 58, sequencer 504 starts conveyors 58, 74 and 75. If the trailing edge of the positive plate has not yet passed sensor 22 in line 53, conveyors 14 and 16 also will be started until this occurs, at which time conveyors 14 and 16 will be stopped by signals on lines 63 and 64 and air cylinder 156 will be advanced by signals on line 80 to cut strip 24. After a time delay, cylinder 156 is retracted and the sequence begins again.

As the negative plate moves off conveyor 98, its leading edge will force strip 84 between rollers 94 and 196, thereby pulling strip 84 from take-up assembly 100 with the assistance of motor 132, if used, which has reversed in response to a signal on line 87; and wrapping the negative plate. Following a time delay depending on the size of the battery core to be wound, cutter cylinder 216 is advanced to cut strip 84 and jaws 206, 208 are closed by outputs on lines 80 and 79. Cylinder 216 is retracted after a further time delay and the sequence begins again. After the trailing edge of the negative plate passes sensor 102 on line 54, conveyor 98, 99 is stopped.

As the wrapped negative plate moves along conveyor 74, conveyor 58 deposits the wrapped positive plate on top of it, so that a sandwich with staggered layers is formed between conveyors 74, 75 as shown in FIG. 7C. Conveyors 74, 75 continue to run for a time depending on the diameter of the battery core as determined by the length of the plate sandwich.

Before winding begins at mechanism 78, cable tensioner cylinder 418 must be retracted by an output on line 132; sensor 426 on line 30 must indicate that sensor arm 422 is in its "home" position; cable clutch brake 402 must be turned off by outputs on lines 61, 62; belt tension cylinder 374 must be retracted as shown by sensor 431 in line 34; and motor 378 must be on. When these conditions exist, the presence of the initial portion of the plate sandwich between arbor 332 and belt 366 causes the tension in the belt to increase thereby moving the piston in cylinder 374 as the plates make their first turn around the arbor. This movement is detected by switch 431 in line 34, which closes. In response, sequencer 504 generates an output on line 132 so that cable tensioner cylinder 148 is vented by its solenoid valve, thereby releasing the tension on cable 414. Simultaneously, signals on lines 61 and 62 cause the clutch-brake assembly 402 to turn on, so that drum 406 begins to pay out cable 408 and arm 422 begins to rotate from its "home" position at sensor 426 on line 30 toward one of sensors 428A and 428B on line 31. Movement of cable 408 around bearings 362 permits the rollers 322, 324 and 326 to move radially at a strictly controlled rate so that the diameter of the roll being formed is held within desired limits.

After a time delay measured from the closure of switch 431, conveyor lock cylinder 530 is retracted in response to an output on line 74. This lowers the output end of conveyor 74 to permit some relative movement between the plates during winding. After a further time delay, cylinder 374 is advanced to release tension on belt 366 so that it will not impede winding.

When sensor arm 422 reaches the preselected one of sensors 428A or 428B, sequencer 504 provides an output on lines 61 and 62 to turn off clutch-brake assembly 402, so that further pay out of cable 408 is prevented and the final diameter of the roll is fixed. Cylinder 480 is then advanced in response to an output on line 73 so that heat sealing of the finished roll may proceed. After a time delay, cylinder 480 retracts.

Sequencer 502 then generates an output on line 71 which actuates the solenoid valve associated with ejector air cylinder 436, causing the cylinder to retract and the ejector to advance, thereby forcing sleeve 462 to the right as shown in FIG. 10. When switch 534 on line 33 closes to indicate that the ejection is complete, an output on line 71 causes the cylinder to advance and the ejector to retract, thus opening switch 534 on line 33 and closing switch 538 on line 32. The clutch-brake assembly 402 is then turned off by a signal on lines 61, 62, after which cylinder 418 is retracted in response to a signal on line 132, so that cable 414 again is tensioned and rollers 322, 324, 326 are pulled back into contact with arbor 332. Sensor arm 422 returns to sensor 426 in line 30 causing the switch to close. In response, cylinder 374 is retracted to reapply tension to belt 366 and conveyor lock cylinder 530 is advanced to reposition conveyor 74. The process then repeats.

While arbor 332 has been previously described as freely rotatable, it should be understood that in some instances, it may be advisable to drive arbor 332 for at least a portion of its initial revolution or revolutions until the last of the staggered leading edges slips between the arbor and the belt. Accordingly, arbor 332 may be selectively driven by providing a timing belt connecting the arbor 332 to a clutch mechanism connected to the winder motor by appropriate connecting mechanism to match the speed ratio between roller 322 and arbor 332. The clutch mechanism may be actuated in accordance with the tension on belt 336 in the same manner as actuation of clutch 406 is accomplished. Thereafter, arbor 532 is freely rotatable as hereinbefore described and such words "freely rotatable" should be understood to mean freely rotatable for at least a portion of the cycle of the winding machine.

Having thus described my invention in sufficient detail to enable those skilled in the art to make and use it, I claim:

1. An improved apparatus for winding an elongated element into a spiral roll, said apparatus comprising:
   means for conveying said element, said means having an outfeed end;
   a freely rotatable winding arbor situated adjacent to said outfeed end;
   three winding rollers positioned about said arbor, said first winding roller being positioned to be passed first by the leading edge of said element and being spaced a first distance from said arbor as winding begins, said second winding roller being positioned to be passed second by the leading edge of said element and being spaced a second, smaller distance from said arbor as winding begins, and said third winding roller being positioned to be passed third by leading edge of said element and being spaced a third, still smaller distance from said arbor as winding begins;

means for rotating at least one of said winding rollers;

means for permitting radial movement of said winding rollers away from said arbor as a spiral roll is formed between said winding rollers and said arbor;

means for guiding the leading edge of said element at least partially around said arbor between said arbor and said winding rollers;

means for constraining said winding rollers to radial movement at a predetermined rate and for stopping radial movement of said winding rollers at a predetermined distance from said arbor, thereby fixing the final diameter of the spiral roll.

2. An improved apparatus for winding an elongated element into a spiral roll, said apparatus comprising:

means for conveying said element, said means having an outfeed end;

a freely rotatable winding arbor situated adjacent said outfeed end;

a plurality of winding rollers positioned about said arbor;

means for rotating at least one of said winding rollers;

means for permitting radial movement of said winding rollers away from said arbor as a spiral roll is formed between said winding rollers and said arbor;

means for guiding the leading edge of said element at least partially around said arbor between said arbor and said winding rollers, said means for guiding comprising at least one guide belt threaded at least partially around the side of said arbor opposite said outfeed end and means for maintaining tension on said guide belt;

means for constraining said winding rollers to radial movement at a predetermined rate and for stopping radial movement of said winding rollers at a predetermined distance from said arbor, thereby fixing the final diameter of the spiral roll; and means responsive to changes in the tension of said guide belt for actuating said means for constraining.

3. Apparatus according to claim 1 wherein said guide belt is a closed loop driven at the same speed as that of said winding rollers.

4. Apparatus according to claim 3, wherein said arbor is laterally spaced from said outfeed end and said guide belt extends across the path of elements leaving said outfeed end, said belt being at an angle of 20° to 30° relative to said path so as to facilitate insertion of said flat element between said arbor and said guide belt.

5. Apparatus according to claim 3, wherein said means for maintaining tension on said guide belt comprises an idler pulley around which said belt is wrapped and means for moving said idler pulley to apply tension to said belt.

6. Apparatus according to claim 1, further comprising means responsive to an increase in the tension in said belt for releasing said means for maintaining tension on said guide belt.

7. An improved apparatus for winding an elongated element into a spiral roll, said apparatus comprising:

a freely rotatable winding arbor;

a plurality of winding rollers positioned about said arbor;

means for conveying said element, said means having an outfeed end situated adjacent said rotatable winding arbor, said means for conveying comprising a first conveyor provided with a first belt extending around a first roller at the output end of said first conveyor, a second conveyor positioned adjacent said first conveyor and provided with a second belt extending around a second roller at the output end of said second conveyor, said first and second belts and rollers being positioned adjacent each other so as to convey said element between said arbor and one of said winding rollers;

means for rotating at least one of said winding rollers;

means for permitting radial movement of said winding rollers away from said arbor as a spiral roll is formed between said winding rollers and said arbor;

means for guiding the leading edge of said element at least partially around said arbor between said arbor and said winding rollers;

means for constraining said winding rollers to radial movement at a predetermined rate and for stopping radial movement of said winding rollers at a predetermined distance from said arbor, thereby fixing the final diameter of the spiral roll.

8. Apparatus according to claim 7, wherein said first conveyor comprises means for moving said first belt and said first roller away from said second conveyor to permit relative movement of the elements of said stack during winding.

9. An improved apparatus for winding an elongated element into a spiral roll, said apparatus comprising:

means for conveying said element, said means having an outfeed end;

a freely rotatable winding arbor situated adjacent to said outfeed end;

a plurality of winding rollers positioned about said arbor;

means for rotating at least one of said winding rollers;

means for permitting radial movement of said winding rollers away from said arbor as a spiral roll is formed between said winding rollers and said arbor;

means for guiding the leading edge of said element at least partially around said arbor between said arbor and said winding rollers;

means for constraining said winding rollers to radial movement at a predetermined rate and for stopping radial movement of said winding rollers at a predetermined distance from said arbor, thereby fixing the final diameter of the spiral roll, said winding rollers adapted for rotation at a constant velocity on shafts supported by said means for permitting radial movements, said means for constraining comprising an elongated flexible element extending from a fixed anchor at one end thereof, at least partially around at least one of said shafts, to a means at the other end thereof for releasing said flexible element at a predetermined velocity to permit said at least one shaft to remove radially away from said arbor.

10. Apparatus according to claim 9, wherein said means for releasing comprises a drum for winding and unwinding said flexible element, and means for rotating said drum to unwind said flexible element at said predetermined velocity.

11. Apparatus according to claim 10, wherein said constraining means further comprises means for sensing the degree of rotation of said drum and for stopping said drum upon sensing a degree of rotation corresponding to the desired final diameter of the spiral roll.

12. Apparatus according to claim 9, wherein said flexible elements extends at least partially around each of said shafts.

13. Apparatus according to claim 12, wherein said elongated flexible element comprises a length of cable, further comprising a bearing on each of said shafts over which said cable is wrapped.

14. Apparatus according to claim 9, wherein said elongated flexible element comprises a length of cable, further comprising on said at least one shaft a bearing over which said cable is wrapped.

* * * * *